US010600111B2

(12) United States Patent
Waldron et al.

(10) Patent No.: US 10,600,111 B2
(45) Date of Patent: Mar. 24, 2020

(54) GEOLOCATION NOTIFICATIONS USING AUGMENTED REALITY USER DEVICES

(71) Applicant: BANK OF AMERICA CORPORATION, Charlotte, NC (US)

(72) Inventors: Willard H. Waldron, Charlotte, NC (US); Victoria L. Dravneek, Charlotte, NC (US); Katherine Dintenfass, Lincoln, RI (US); Graham M. Wyllie, Charlotte, NC (US); Kenneth A. Kaye, Indianapolis, IN (US); Heather Dolan, Sarasota, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 427 days.

(21) Appl. No.: 15/365,272

(22) Filed: Nov. 30, 2016

(65) Prior Publication Data

US 2018/0150903 A1 May 31, 2018

(51) Int. Cl.
*G06Q 30/00* (2012.01)
*G06Q 30/06* (2012.01)
(Continued)

(52) U.S. Cl.
CPC ......... *G06Q 30/0639* (2013.01); *G06F 3/011* (2013.01); *G06Q 30/0641* (2013.01); *G06T 19/006* (2013.01)

(58) Field of Classification Search
CPC .................................................. G06Q 30/00
See application file for complete search history.

(56) References Cited

U.S. PATENT DOCUMENTS

| 5,999,944 | A | 12/1999 | Lipkin |
| 6,408,257 | B1 | 6/2002 | Harrington et al. |

(Continued)

FOREIGN PATENT DOCUMENTS

CN 103635920 A 3/2014

OTHER PUBLICATIONS

Levski Yariv, How augmented reality benefits retail and shopping, App Real, dated Jun. 3, 2016 (Year: 2016).*

(Continued)

*Primary Examiner* — Mark A Fadok
(74) *Attorney, Agent, or Firm* — Michael A. Springs

(57) ABSTRACT

An augmented reality system that includes an augmented reality user device. The augmented reality user device includes a display for overlaying virtual objects onto objects in a real scene, a camera, and a global position system sensor. The augmented reality user device includes a processor implementing an object recognition engine, a virtual assessment engine, and a virtual overlay engine. The object recognition engine identifies a business from an image. The virtual assessment engine authenticates the user and identifies a user identifier for the user. The virtual assessment engine captures an image, performs object recognition on the image to identify the business, and generates a location identifier identifying the business. The virtual assessment engine sends a token with the user identifier and the location identifier to a remote server, receives geolocation notifications for the user from the server, and presents the geolocation notifications as virtual objects overlaid with a real scene.

20 Claims, 10 Drawing Sheets

(51) Int. Cl.
*G06T 19/00* (2011.01)
*G06F 3/01* (2006.01)

(56) References Cited

U.S. PATENT DOCUMENTS

| | | |
|---|---|---|
| 6,602,075 B2 | 8/2003 | Adams |
| 6,602,076 B2 | 8/2003 | Adams |
| 6,625,299 B1 | 9/2003 | Meisner et al. |
| 6,871,140 B1 | 3/2005 | Florance et al. |
| 6,941,001 B1 | 9/2005 | Bolle et al. |
| 7,099,850 B1 | 8/2006 | Mann, II et al. |
| 7,392,208 B2 | 6/2008 | Morse et al. |
| 7,680,694 B2 | 3/2010 | Glazer et al. |
| 7,817,104 B2 | 10/2010 | Ryu et al. |
| 7,831,471 B2 | 11/2010 | Adams |
| 7,834,883 B2 | 11/2010 | Adams |
| 8,069,095 B2 | 11/2011 | Glazer et al. |
| 8,165,924 B2 | 4/2012 | Smyers et al. |
| 8,194,101 B1* | 6/2012 | Mann ................ G09G 5/00 345/633 |
| 8,285,638 B2 | 10/2012 | Jung et al. |
| 8,326,704 B2 | 12/2012 | Glazer et al. |
| 8,396,738 B1 | 3/2013 | Allan et al. |
| 8,417,625 B2 | 4/2013 | Bannerjee et al. |
| 8,433,650 B1 | 4/2013 | Thomas |
| 8,438,001 B2 | 5/2013 | Natarajan et al. |
| 8,438,110 B2 | 5/2013 | Calman et al. |
| 8,442,295 B2 | 5/2013 | Sam |
| 8,442,906 B1 | 5/2013 | Thomas |
| 8,451,266 B2 | 5/2013 | Hertenstein |
| 8,577,803 B2 | 11/2013 | Chatterjee et al. |
| 8,589,255 B2 | 11/2013 | Glazer et al. |
| 8,601,386 B2 | 12/2013 | Altberg et al. |
| 8,611,601 B2 | 12/2013 | Calman et al. |
| 8,612,363 B2 | 12/2013 | Karkanias et al. |
| 8,635,104 B2 | 1/2014 | Adams |
| 8,660,951 B2 | 2/2014 | Calman et al. |
| 8,688,594 B2 | 4/2014 | Thomas et al. |
| 8,718,612 B2 | 5/2014 | Calman et al. |
| 8,743,145 B1* | 6/2014 | Price ................ G06T 19/006 345/633 |
| 8,803,916 B1 | 8/2014 | Paczkowski et al. |
| 8,805,739 B2 | 8/2014 | Brown et al. |
| 8,810,599 B1 | 8/2014 | Tseng |
| 8,890,896 B1 | 11/2014 | Tseng |
| 8,929,591 B2 | 1/2015 | Calman et al. |
| 8,990,914 B2 | 3/2015 | Da Cruz Pinto et al. |
| 9,007,473 B1 | 4/2015 | Worley, III et al. |
| 9,026,486 B2 | 5/2015 | Doorhy et al. |
| 9,044,673 B1 | 6/2015 | Ahuja et al. |
| 9,047,636 B2 | 6/2015 | Ross |
| 9,066,200 B1 | 6/2015 | Loxam et al. |
| 9,082,149 B2 | 7/2015 | Argue et al. |
| 9,092,600 B2 | 7/2015 | Scavezze et al. |
| 9,092,898 B1 | 7/2015 | Fraccaroli et al. |
| 9,100,493 B1 | 8/2015 | Zhou et al. |
| 9,105,013 B2 | 8/2015 | Chavez |
| 9,111,383 B2 | 8/2015 | Fein et al. |
| 9,153,074 B2 | 10/2015 | Zhou et al. |
| 9,223,950 B2 | 12/2015 | Li et al. |
| 9,230,367 B2 | 1/2016 | Stroila |
| 9,251,504 B2 | 2/2016 | Chavez |
| 9,317,860 B2 | 4/2016 | Calman et al. |
| 9,331,969 B2 | 5/2016 | Barak et al. |
| 9,338,589 B2 | 5/2016 | Loxam et al. |
| 9,342,928 B2 | 5/2016 | Rasane et al. |
| 9,349,118 B2 | 5/2016 | Chavez |
| 9,355,123 B2 | 5/2016 | Wnuk et al. |
| 9,367,878 B2 | 6/2016 | Rao |
| 9,563,983 B2* | 2/2017 | Bean ................ G06T 19/006 |
| 9,685,000 B1* | 6/2017 | Rabe ................ G06T 19/006 |
| 9,697,235 B2* | 7/2017 | Bastaldo-Tsampalis ................ G06F 16/5838 |
| 9,721,386 B1* | 8/2017 | Worley, III ........ G06T 19/006 |
| 9,779,554 B2* | 10/2017 | Stafford ................ A63F 13/211 |
| 9,894,116 B2* | 2/2018 | Ratcliff ................ G06Q 50/10 |
| 10,019,962 B2* | 7/2018 | Liu ................ G09G 5/00 |
| 10,032,312 B2* | 7/2018 | Bean ................ G02B 27/01 |
| 10,158,634 B2* | 12/2018 | Votaw ................ H04L 63/0861 |
| 2002/0044152 A1 | 4/2002 | Abbott, III et al. |
| 2007/0061211 A1* | 3/2007 | Ramer ................ G06Q 20/12 705/25 |
| 2009/0144105 A1* | 6/2009 | Blatchley ................ G06Q 30/02 705/14.12 |
| 2010/0121480 A1* | 5/2010 | Stelzer ................ B65G 1/137 700/215 |
| 2010/0238161 A1 | 9/2010 | Varga et al. |
| 2011/0134108 A1 | 6/2011 | Hertenstein |
| 2011/0213664 A1* | 9/2011 | Osterhout ................ G02B 27/017 705/14.58 |
| 2012/0156668 A1 | 6/2012 | Zelin |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0310826 A1 | 12/2012 | Chatterjee |
| 2013/0044128 A1* | 2/2013 | Liu ................ G09G 5/00 345/633 |
| 2013/0166332 A1 | 6/2013 | Hammad |
| 2013/0226682 A1 | 8/2013 | Grossman |
| 2014/0040127 A1 | 2/2014 | Chatterjee et al. |
| 2014/0067712 A1 | 3/2014 | Prasad et al. |
| 2014/0095497 A1* | 4/2014 | Howe ................ G06F 16/29 707/736 |
| 2014/0100994 A1 | 4/2014 | Tatzel et al. |
| 2014/0172559 A1 | 6/2014 | Calman et al. |
| 2014/0172570 A1* | 6/2014 | y Arcas ................ H04W 4/21 705/14.58 |
| 2014/0181678 A1 | 6/2014 | Louchheim et al. |
| 2014/0214547 A1* | 7/2014 | Signorelli ................ G06Q 30/0267 705/14.64 |
| 2014/0279426 A1 | 9/2014 | Holman et al. |
| 2014/0330511 A1 | 11/2014 | Tison et al. |
| 2014/0337175 A1 | 11/2014 | Katzin et al. |
| 2014/0368538 A1* | 12/2014 | Ratcliff ................ G06Q 50/10 345/633 |
| 2014/0379468 A1 | 12/2014 | Ganesh et al. |
| 2015/0012426 A1 | 1/2015 | Purves et al. |
| 2015/0046284 A1 | 2/2015 | Hart |
| 2015/0058229 A1 | 2/2015 | Wiacek et al. |
| 2015/0066722 A1 | 3/2015 | Calman et al. |
| 2015/0073907 A1 | 3/2015 | Purves et al. |
| 2015/0082203 A1 | 3/2015 | James et al. |
| 2015/0154446 A1 | 6/2015 | Masood et al. |
| 2015/0186984 A1 | 7/2015 | Loganathan |
| 2015/0206218 A1 | 7/2015 | Banerjee et al. |
| 2015/0221151 A1 | 8/2015 | Bacco et al. |
| 2015/0229750 A1 | 8/2015 | Zhou et al. |
| 2015/0254510 A1 | 9/2015 | McKinnon et al. |
| 2015/0294322 A1 | 10/2015 | Grigg et al. |
| 2015/0302027 A1 | 10/2015 | Wnuk et al. |
| 2015/0324562 A1 | 11/2015 | Scavezze et al. |
| 2015/0339468 A1 | 11/2015 | Son et al. |
| 2015/0348329 A1 | 12/2015 | Carre et al. |
| 2015/0363761 A1 | 12/2015 | Grigg et al. |
| 2015/0363764 A1 | 12/2015 | Grigg et al. |
| 2016/0012430 A1* | 1/2016 | Chandrasekaran .. G06Q 20/385 705/44 |
| 2016/0019239 A1* | 1/2016 | Bastaldo-Tsampalis ................ G06F 16/5838 345/632 |
| 2016/0049095 A1 | 2/2016 | Yannier et al. |
| 2016/0063484 A1 | 3/2016 | Carpenter et al. |
| 2016/0063517 A1 | 3/2016 | Sorensen |
| 2016/0078449 A1 | 3/2016 | Banerjee |
| 2016/0086029 A1* | 3/2016 | Dubuque ................ G06K 9/00536 382/159 |
| 2016/0098936 A1 | 4/2016 | Solomon |
| 2016/0155267 A1* | 6/2016 | Bean ................ G02B 27/01 345/633 |
| 2016/0163000 A1* | 6/2016 | Calman ................ G06Q 30/0633 705/26.8 |
| 2016/0171767 A1 | 6/2016 | Anderson |

(56) References Cited

U.S. PATENT DOCUMENTS

| | | | |
|---|---|---|---|
| 2016/0188861 A1 | 6/2016 | Todeschini | |
| 2016/0189426 A1 | 6/2016 | Thomas et al. | |
| 2016/0206960 A1 | 7/2016 | Allen et al. | |
| 2016/0210784 A1 | 7/2016 | Ramsby et al. | |
| 2016/0210790 A1 | 7/2016 | Rasane et al. | |
| 2016/0217623 A1 | 7/2016 | Singh | |
| 2016/0252359 A1* | 9/2016 | Ikavalko | G01C 21/00 701/414 |
| 2016/0260255 A1* | 9/2016 | Bean | G06T 19/006 |
| 2016/0261703 A1* | 9/2016 | Demsey | H04L 67/2842 |
| 2016/0284014 A1* | 9/2016 | Adel | G06Q 30/0639 |
| 2016/0300388 A1* | 10/2016 | Stafford | A63F 13/211 |
| 2018/0139204 A1* | 5/2018 | Votaw | H04L 63/0861 |

OTHER PUBLICATIONS

Charles Owen et al, Personalized In-store E-commerce with promo pad: an Augmented Reality Shopping assistant, ResearchGate, dated Jan. 2004. (Year: 2004).*

Saettler, M., "Westpac integrates augmented reality into bank account management," http://www.mobilecommercedaily.com/westpac-integrates-augmented-reality-into-bank-account-management, Aug. 6, 2014, 8 pages.

Dolan, H. et al., "Facilitating Digital Data Transfers Using Augmented Reality Display Devices," U.S. Appl. No. 15/353,005, filed Nov. 16, 2016, 50 pages.

Johansen, J. N. et al., "Real World Gamification Using Augmented Reality User Devices," U.S. Appl. No. 15/377,690, filed Dec. 13, 2016, 70 pages.

Adams, A. J. et al., "Virtual Reality Dynamic Authentication," U.S. Appl. No. 15/367,590, filed Dec. 2, 2016, 58 pages.

Lee, J. et al., "Contextual Augmented Reality Overlays," U.S. Appl. No. 15/363,388, filed Nov. 29, 2016, 50 pages.

Waldron, W. H. et al., "Virtual Assessments Using Augmented Reality User Devices," U.S. Appl. No. 15/364,927, filed Nov. 30, 2016, 85 pages.

Votaw, E. S. et al., "Remote Document Execution and Network Transfer Using Augmented Reality Display Devices," U.S. Appl. No. 15/353,370, filed Nov. 16, 2016, 42 pages.

Dolan, H. et al., "Augmented Reality Headset and Digital Wallet," U.S. Appl. No. 15/363,692, filed Nov. 29, 2016, 41 pages.

Johansen, J. N., "Facilitating Dynamic Across-Network Location Determination Using Augmented Reality Display Devices," U.S. Appl. No. 15/372,909, filed Dec. 8, 2016, 44 pages.

Ogrinz, M. et al., "Facilitating Network Security Analysis Using Virtual Reality Display Devices." U.S. Appl. No. 15/367,896, filed Dec. 2, 2016, 44 pages.

Dintenfass, K., "Property Assessments Using Augmented Reality User Devices," U.S. Appl. No. 15/367,435, filed Dec. 2, 2016, 81 pages.

Wadley, C. D. et al., "Facilitating Across-Network, Multi-User Sessions Using Augmented Reality Display Devices," U.S. Appl. No. 15/397,086, filed Jan. 3, 2017, 49 pages.

Dintenfass, K., "Geo-targeted Property Analysis Using Augmented Reality User Devices," U.S. Appl. No. 15/367,554, filed Dec. 2, 2016, 80 pages.

Adams, A. J. et al., "Augmented Reality Dynamic Authentication for Electronic Transactions," U.S. Appl. No. 15/367,551, filed Dec. 2, 2016, 57 pages.

Lee, J., "Facilitating Digital Data Transfers Using Virtual Reality Display Devices," U.S. Appl. No. 15/363,185, filed Nov. 29, 2016, 52 pages.

Dintenfass, K., "Real Estate Property Project Analysis Using Augmented Reality User Devices," U.S. Appl. No. 15/367,822, filed Dec. 2, 2016, 81 pages.

Adams, A. J. et al., "Augmented Reality Dynamic Authentication," U.S. Appl. No. 15/367,502, filed Dec. 2, 2016, 57 pages.

Waldron, W. H. et al., "Virtual Behavior Training Using Augmented Reality User Devices," U.S. Appl. No. 15/377,795, filed Dec. 13, 2016, 71 pages.

Dolan, H. et al., "User Authentication and Authorization for Electronic Transaction," U.S. Appl. No. 15/363,495, filed Nov. 29, 2016, 41 pages.

Waldron, W. H. et al., "Object Recognition and Analysis Using Augmented Reality User Devices," U.S. Appl. No. 15/365,511, filed Nov. 30, 2016, 86 pages.

Wadley, C. D. et al., "Facilitating Across-Network Handoffs for Devices Using Augmented Reality Display Devices," U.S. Appl. No. 15/397,031, filed Jan. 3, 2017, 49 pages.

Wadley, C. D. et al., "Facilitating Across-Network Handoffs for an Assistant Using Augmented Reality Display Devices," U.S. Appl. No. 15/397,125, filed Jan. 3, 2017, 48 pages.

Johansen, J. N., "Facilitating Dynamic Across-Network Location Determination Using Augmented Reality Display Devices," U.S. Appl. No. 15/372,964, filed Dec. 8, 2016, 43 pages.

\* cited by examiner

GEOLOCATION NOTIFICATIONS USING AUGMENTED REALITY USER DEVICES

TECHNICAL FIELD

The present disclosure relates generally to performing operations using an augmented reality display device that overlays graphic objects with objects in a real scene.

BACKGROUND

Throughout the course of a day, a person may need to aggregating information from multiple sources to make decisions. Existing two-dimensional graphical user interfaces limit the amount of information the person can see based on the size of the display. In addition, the person may have to interact with multiple windows or screens on the graphical user interface in order to view all of the information the person is interested in. Using existing graphical user interfaces and having to interact with multiple windows or screens causes a disconnect between the information being present and a real world environment.

Using existing systems, when a person is looking for information that is located among different databases with different sources, the person has to make data requests to each of the different sources in order to obtain the desired information. The process of making multiple data requests to different data sources requires a significant amount of processing resources to generate the data requests. Typically, processing resources are limited and the system is unable to perform other tasks when processing resources are occupied which degrades the performance of the system.

The process of sending multiple data requests and receiving information from multiple sources occupies network resources until all of the information has been collected. This process poses a burden on the network which degrades the performance of the network. Thus, it is desirable to provide the ability to securely and efficiently aggregate information from multiple data sources.

SUMMARY

In one embodiment, the disclosure includes an augmented reality system with an augmented reality user device for a user. The augmented reality user device has a display for overlaying virtual objects onto tangible objects in a real scene in real-time. The augmented reality user device also has a camera configured to capture images of tangible objects and a global position system (GPS) sensor configured to provide the geographic location of the user. The augmented reality user device further includes one or more processors connected to the display, the camera, and the GPS sensor.

The processors implement an object recognition engine, a virtual assessment engine, and a virtual overlay engine. The object recognition engine is used to identify a business based on an image of the business. The virtual assessment engine authenticates a user based on a user input and identifies a user identifier for the user in response to authenticating the user. The virtual assessment engine generates a location identifier identifying the business and generates a token that includes the user identifier, and the location identifier. The virtual assessment engine sends the token to a remote server and receives virtual assessment data with a geolocation notification identifying an offer provided by the business in response to sending the token. The virtual overlay engine presents the geolocation notification as a virtual object overlaid within a real scene.

The augmented reality system further includes the remote server with a geolocation analysis engine. The geolocation analysis engine receives the token and determines account information for the user based on the user identifier. The geolocation analysis engine identifies the offer provided by the business based on the location identifier and the account information for the user and generates the geolocation notification identifying the offer. The geolocation analysis engine generates the virtual assessment data that includes the geolocation notification and sends the virtual assessment data to the augmented reality user device.

In one embodiment, an augmented reality user device aggregates information for a user looking at products in a store. The augmented reality user device identifies the products the user is looking at and aggregates information related to a purchase of the products. The augmented reality user device presents information to the user as virtual objects overlaid with the products in a real scene in front of the user. The aggregated information may include a price for the products, account information, offers (e.g. coupons or promotions), recommendations, and/or any other information for the user. The aggregated information is customized for the user and based on information related to the user.

In another embodiment, an augmented reality user device aggregate information for a user looking at a product with a significant cost such as a vehicle or an appliance. The augmented reality user device identifies the product and aggregates information related to a purchase of the product. The augmented reality user device presents information to the user as virtual objects overlaid with the product in a real scene in front of the user. The aggregated information may include information about the product, information about other similar products, information about other vendors, payment options (e.g. existing accounts and available new accounts), and/or any other information for the user.

In yet another embodiment, an augmented reality user device aggregates information for a user based on businesses located near the user, for example, in front of the user. The augmented reality user device identifies businesses the user is looking at and aggregates information about the business and/or products and services the business provides. The augmented reality user device identifies the businesses based on their geographic location and/or their features (e.g. signs and branding). The aggregated information may include information about a business, information about offers on products or services provided by the business, and/or any other information. The augmented reality user device presents information to the user as virtual objects overlaid with the businesses in a real scene in front of the user.

The present embodiment presents several technical advantages. In one embodiment, an augmented reality user device allows a user to reduce the number of requests used to obtain information from multiple data sources. Additionally, the augmented reality user device allows the user to authenticate themselves which allows the user to request and obtain information that is specific to the user and without having to provide different credentials to authenticate the user with each data source.

The amount of processing resources used for the reduced number of data requests is significantly less than the amount of processing resources used by existing systems. The overall performance of the system is improved as a result of consuming less processing resources. Reducing the number of data requests also reduces the amount of data traffic used to obtain information from multiple sources which results in improved network utilization and network performance.

The augmented reality user device generates tokens based on the identity of a user and the location of the user which improves the performance of the augmented reality user device by reducing the amount of information used to request. Tokens are encoded or encrypted to obfuscate and mask information being communicated across a network. Masking the information being communicated protects users and their information in the event of unauthorized access to the network and/or data occurs.

The augmented reality user device uses object recognition and optical character recognition to identify the location of the user and/or objects the user is looking at. Retrieving information about the location of the user and objects the user is looking at using object recognition and optical character recognition allows the augmented reality user device to reduce the amount of time involved to make a data request compared to existing systems that rely on the user to manually enter all of the information for a request. This process for collecting information for the data request also reduces the likelihood of user input errors and improves the reliability of the system.

Another technical advantage is the augmented reality user device allows a user to view information as a virtual or graphic object overlaid onto tangible objects in the real scene in front of the user. This allows the user to quickly view information in the context of the actual scene in front of the user.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
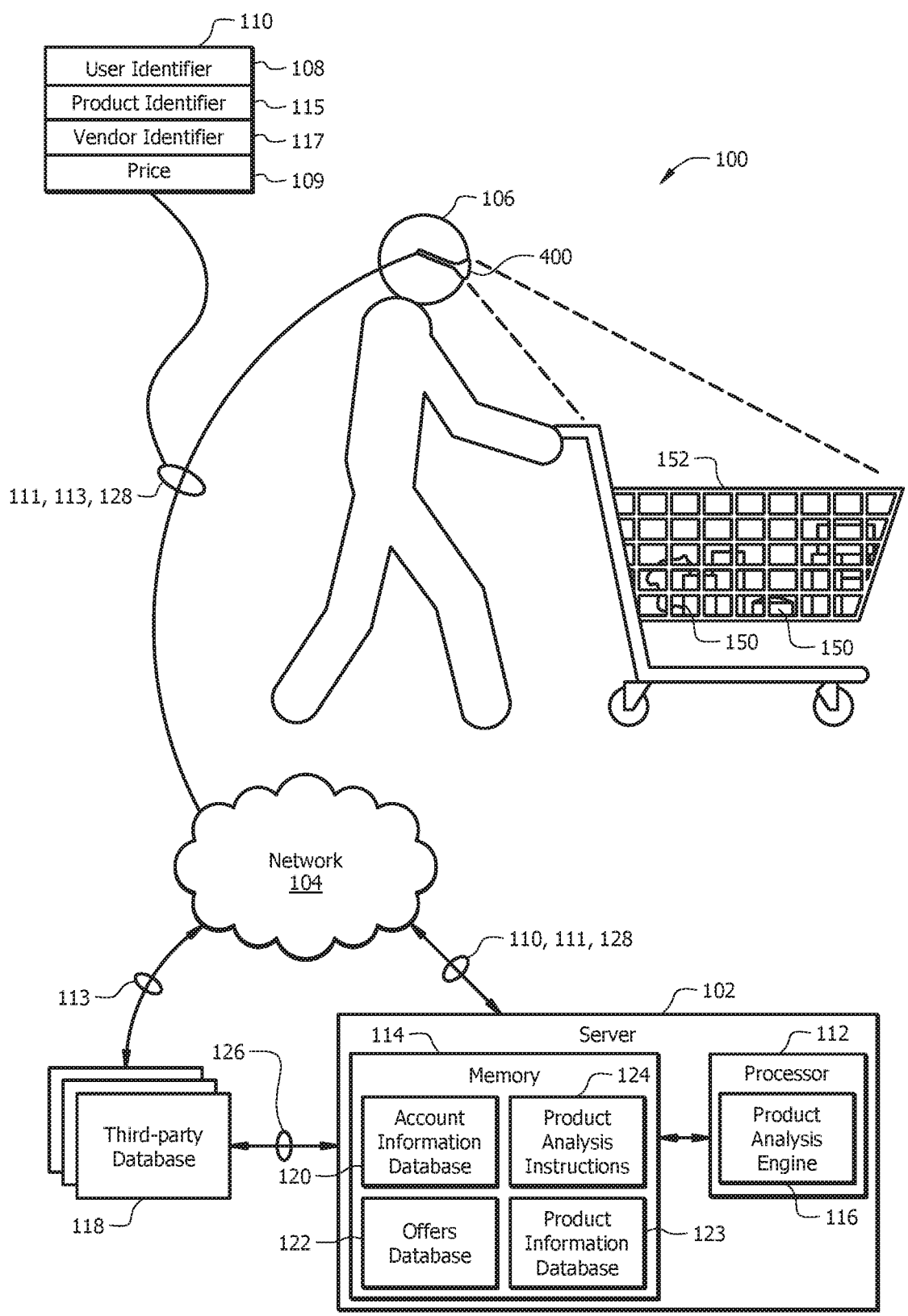
FIG. 1 is a schematic diagram of an embodiment of an augmented reality system configured to overlay virtual objects with a real scene.

Throughout the course of a day a person may need to aggregate different kinds of information from multiple sources, for example, to make various decision. For example, the person may want to look-up their personal information, information about the location of the person, information about an object, or any other information. All of this information may be located in different databases with different sources which results in several technical problems.

Using existing systems, the person has to make individual data requests to each of the different sources in order to obtain the desired information. This process involves making numerous data requests to different data sources which uses a significant amount of processing resources to generate the data requests. Typically processing resources are limited and the system is unable to perform other tasks when processing resources are occupied which degrades the performance of the system. The process of sending numerous data requests and receiving information from multiple sources occupies network resources until all of the information has been collected. This process poses a burden on the network which degrades the performance of the network.

Additionally, each data request may use different credentials to authenticate the person with each of the different sources. Providing different credentials to each source increases the complexity of the system and increases the amount of data that is sent across the network. The increased complexity of the system makes existing systems difficult to manage. The additional data that is sent across the network both occupies additional network resources and exposes additional sensitive information to network.

A technical solution to these technical problems is an augmented reality user device that allows a user to reduce the number of data requests used to obtain information from multiple sources. The augmented reality user device allows the user to process an image to extract information from for the data request. The augmented reality user device allows the user to authenticate themselves to obtain information that allows the user to request and obtain personal information that is specific to the user with the same data request. The amount of processing resources used to generate the reduced number of data requests is significantly less than the amount of processing resources used by existing systems to generate numerous data requests. The overall performance of the system is improved as a result of consuming less processing resources. Using a reduced number of data requests to obtain information from multiple sources reduces the amount of data traffic used to obtain the information which results in improved network utilization and network performance.

Securely transferring data and information across a network poses several technical challenges. Networks are susceptible to attacks by unauthorized users trying to gain access to sensitive information being communicated across the network. Unauthorized access to a network may compromise the security of the data and information being communicated across the network.

One technical solution for improving network security is an augmented reality user device that generates and uses tokens that are used by augmented reality user device to request potentially sensitive information. The augmented reality user device allows tokens to be generated automatically upon identifying and extracting information from an image. The token may be encoded or encrypted to obfuscate the information being communicated by it. Using tokens to mask information that is communicated across the network protects users and their information in the event of unauthorized access to the network and/or data occurs. The tokens also allow for data transfers to be executed using less information than other existing systems, and thereby reduces the amount of data that is communicated across the network. Reducing the amount of data that is communicated across the network improves the performance of the network by reducing the amount of time network resource are occupied.

The augmented reality user device uses object recognition and optical character recognition of images to quickly retrieve information for generating tokens. The augmented reality user device allows information for generating tokens to be retrieved based on an image of an object which significantly reduces the amount of time involved to make a data request compared to existing systems that rely on the user to manually enter all of the information for the request. Using object recognition and optical character recognition to identify and to retrieve information also allows the augmented reality user device to be less dependent on user input, which reduces the likelihood of user input errors and improves reliability of the system.

Another technical challenge of using existing systems is the usage of two-dimensional graphical user interfaces. Existing two-dimensional graphical user interfaces limit the amount of information the person can see based on the size of the display. In addition, the person may have to interact with multiple windows or screens on the graphical user interface in order to view all of the information the person is interested in. Using existing graphical user interfaces and having to interact with multiple windows or screens causes a disconnect between the information being present and a real world environment.

An augmented reality user device allows a user view information as virtual or graphical object overlaid onto the physical object in real-time. For example, using the augmented reality user device, the user is able to quickly view information about one or more objects that are in front of the user. The user is able to view information about the objects, their personal information, and/or the location of the user as a virtual object overlaid onto any tangible objects in the real scene in front of the user.

Figure 9:
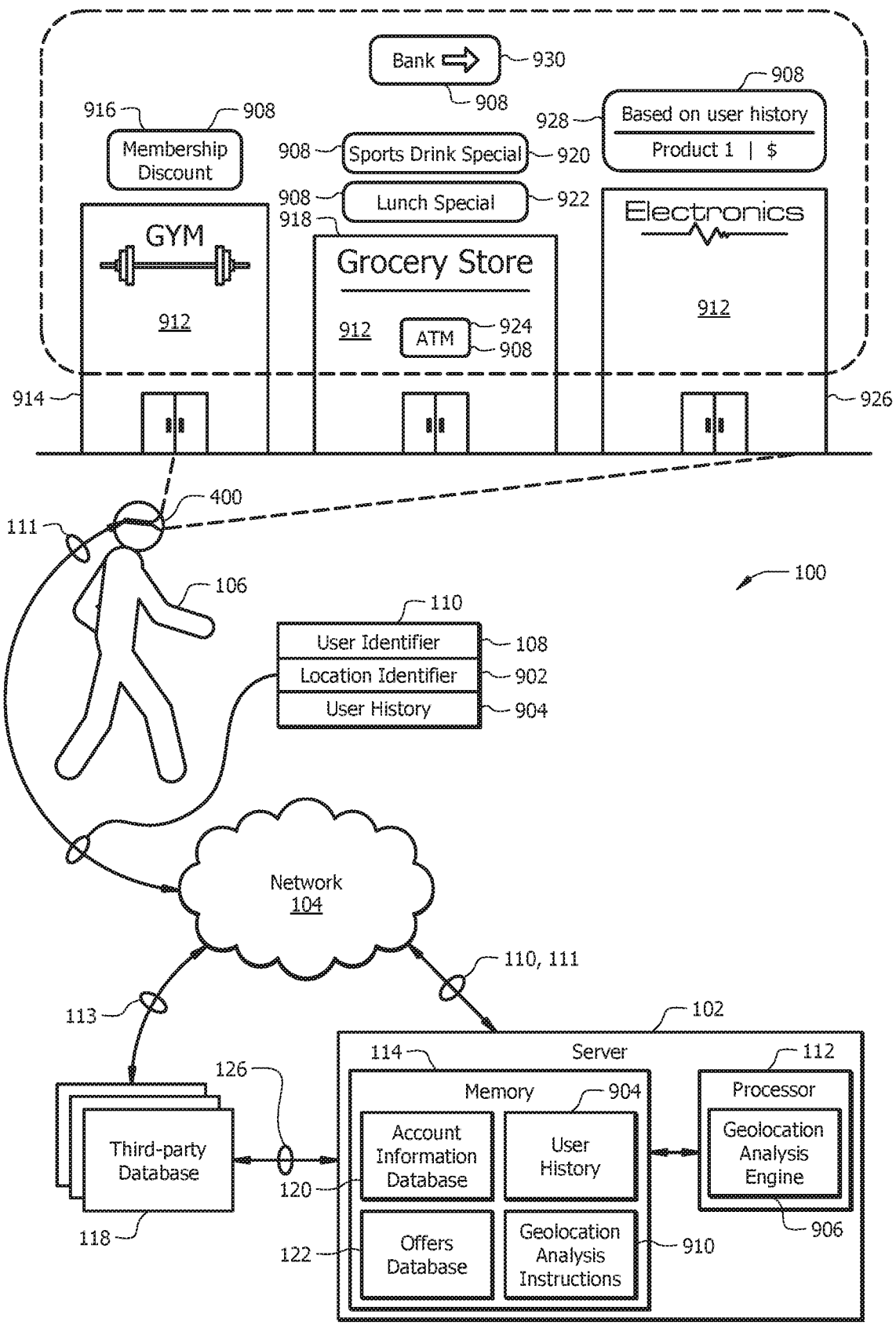
FIG. 9 is a schematic diagram of another embodiment of an augmented reality system configured to overlay virtual objects with a real scene.

FIGS. 1 and 9 illustrate different examples of a user employing an augmented reality user device to view virtual objects overlaid with tangible objects in a real scene in front of the user. FIG. 1 illustrates an example of an augmented reality system configured to aggregate information about one or more products. FIG. 9 illustrates an example of an augmented reality system configured to aggregate information about a business.

Figure 2:
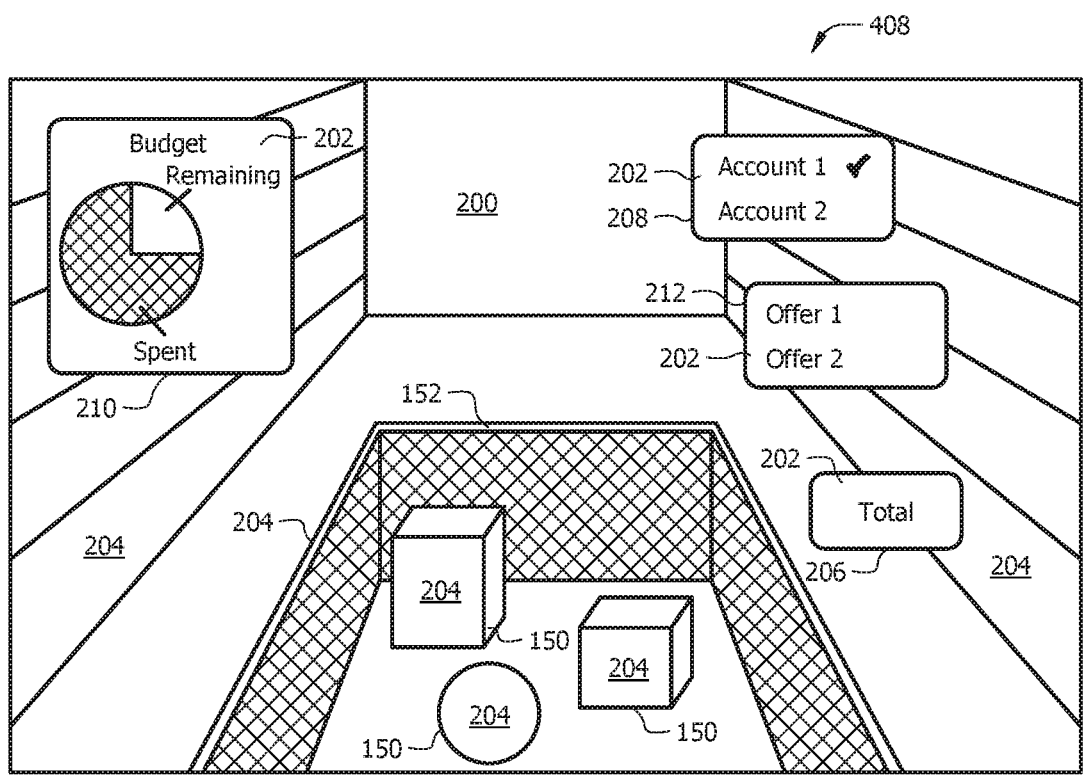
FIG. 2 is a first person view of an embodiment for an augmented reality user device overlaying virtual objects with a real scene.
Figure 3:
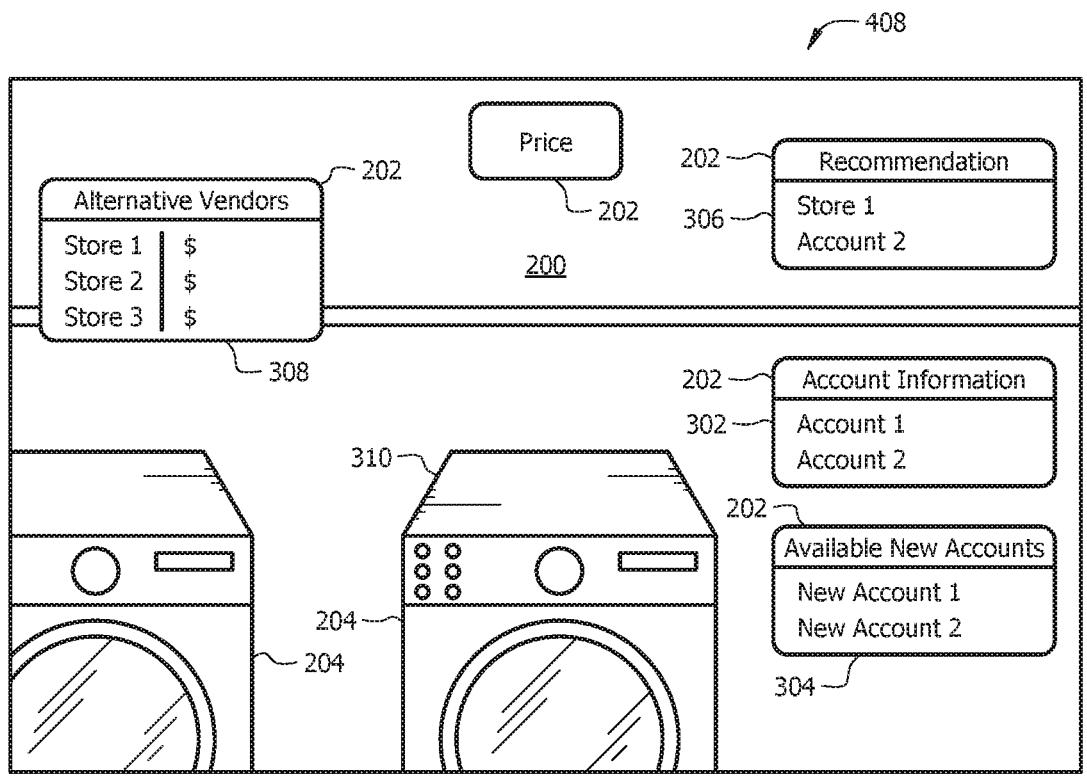
FIG. 3 is a first person view of another embodiment for an augmented reality user device overlaying virtual objects with a real scene.
Figure 4:
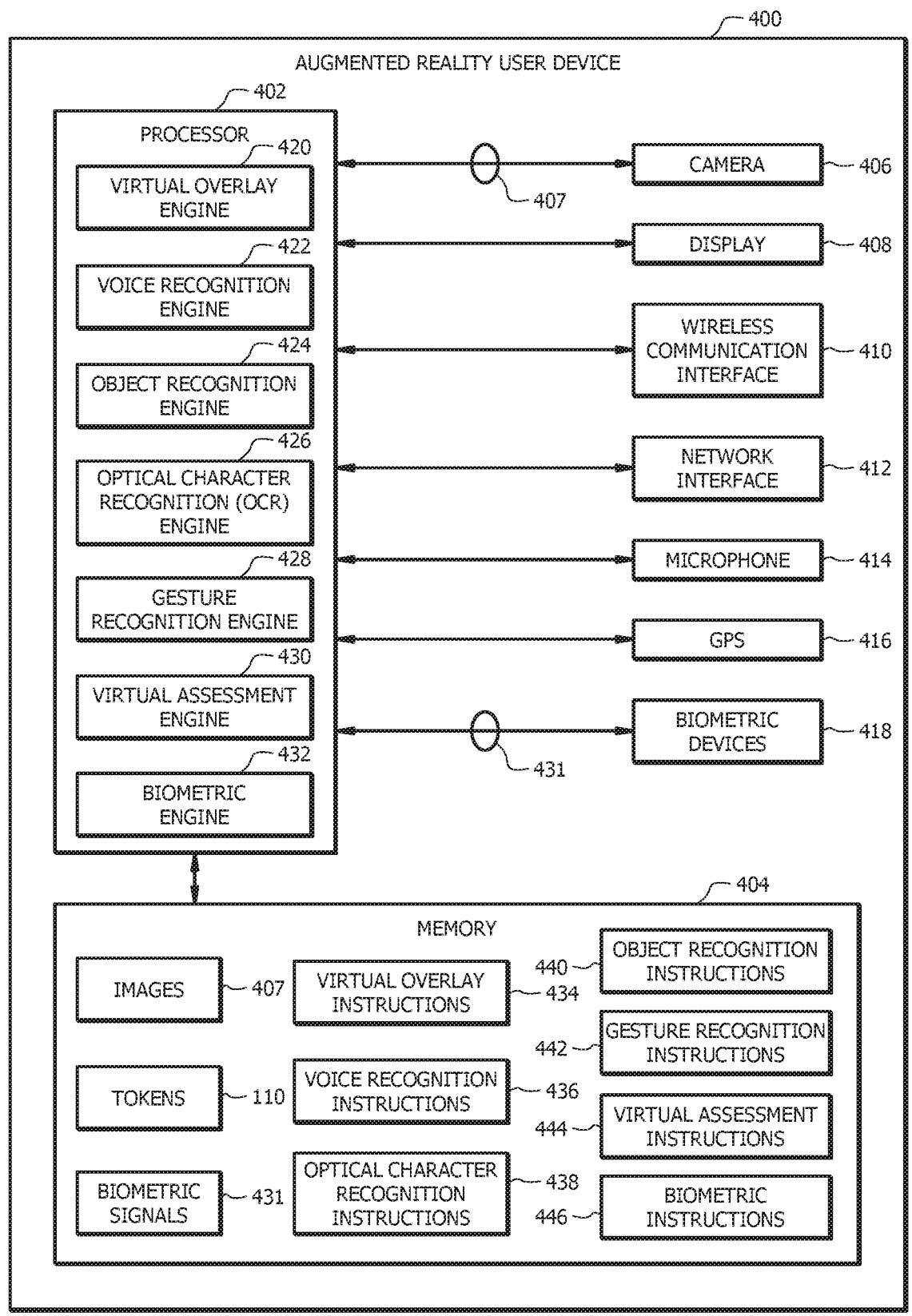
FIG. 4 is a schematic diagram of an embodiment of an augmented reality user device employed by the augmented reality system.
Figure 5:
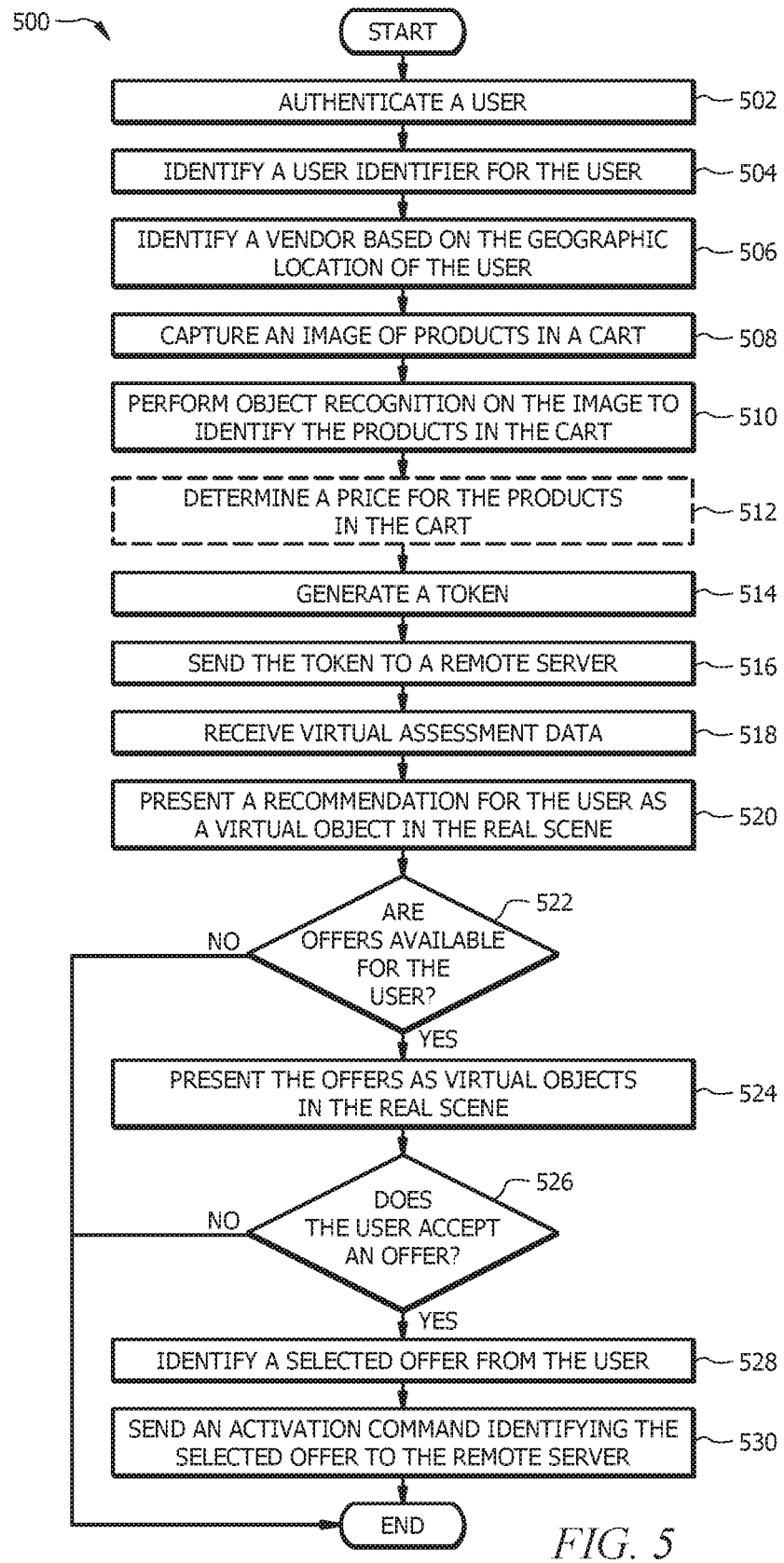
FIG. 5 is a flowchart of an embodiment of an augmented reality overlaying method.
Figure 6:
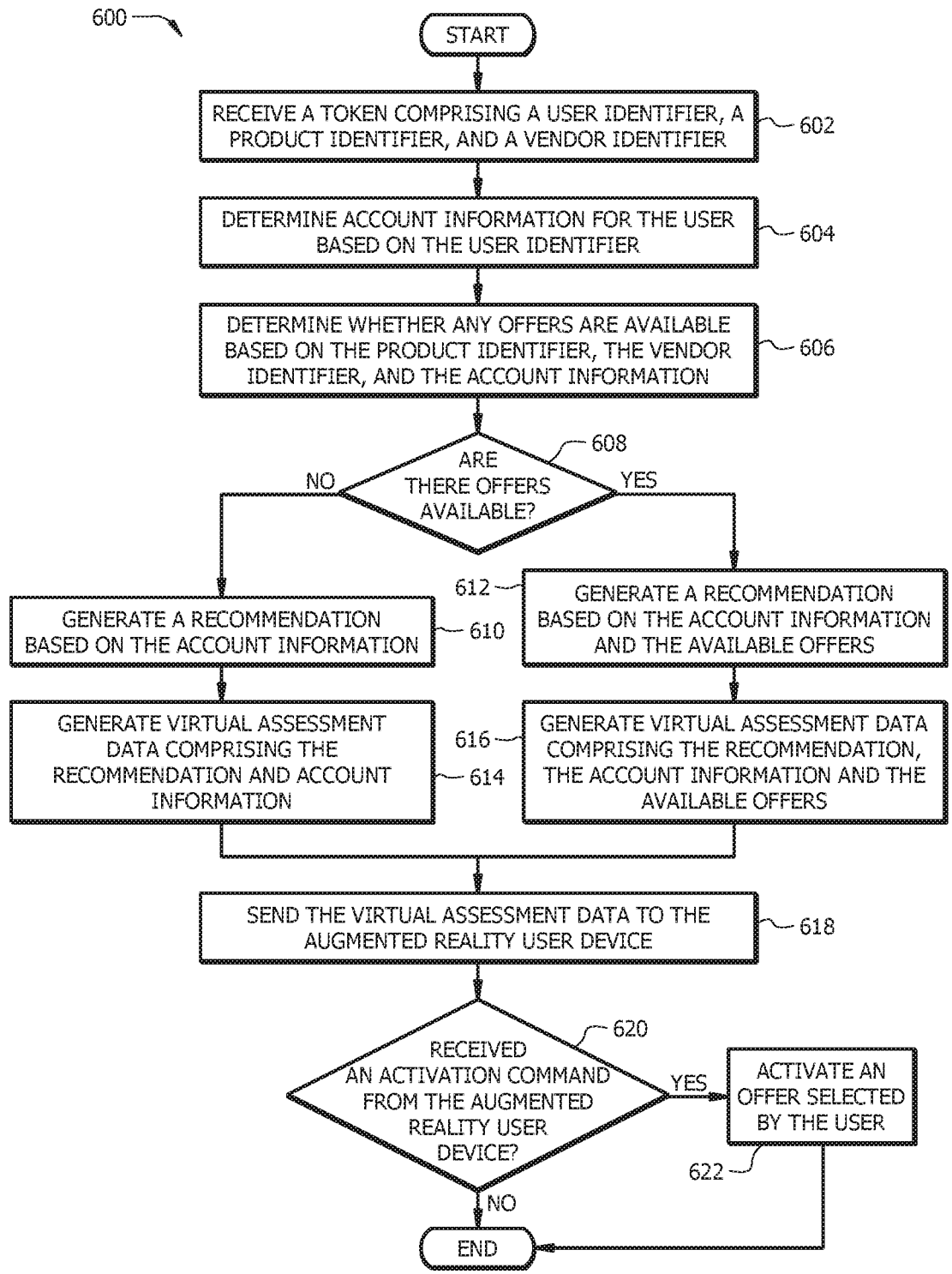
FIG. 6 is a flowchart of another embodiment of an augmented reality overlaying method.
Figure 7:
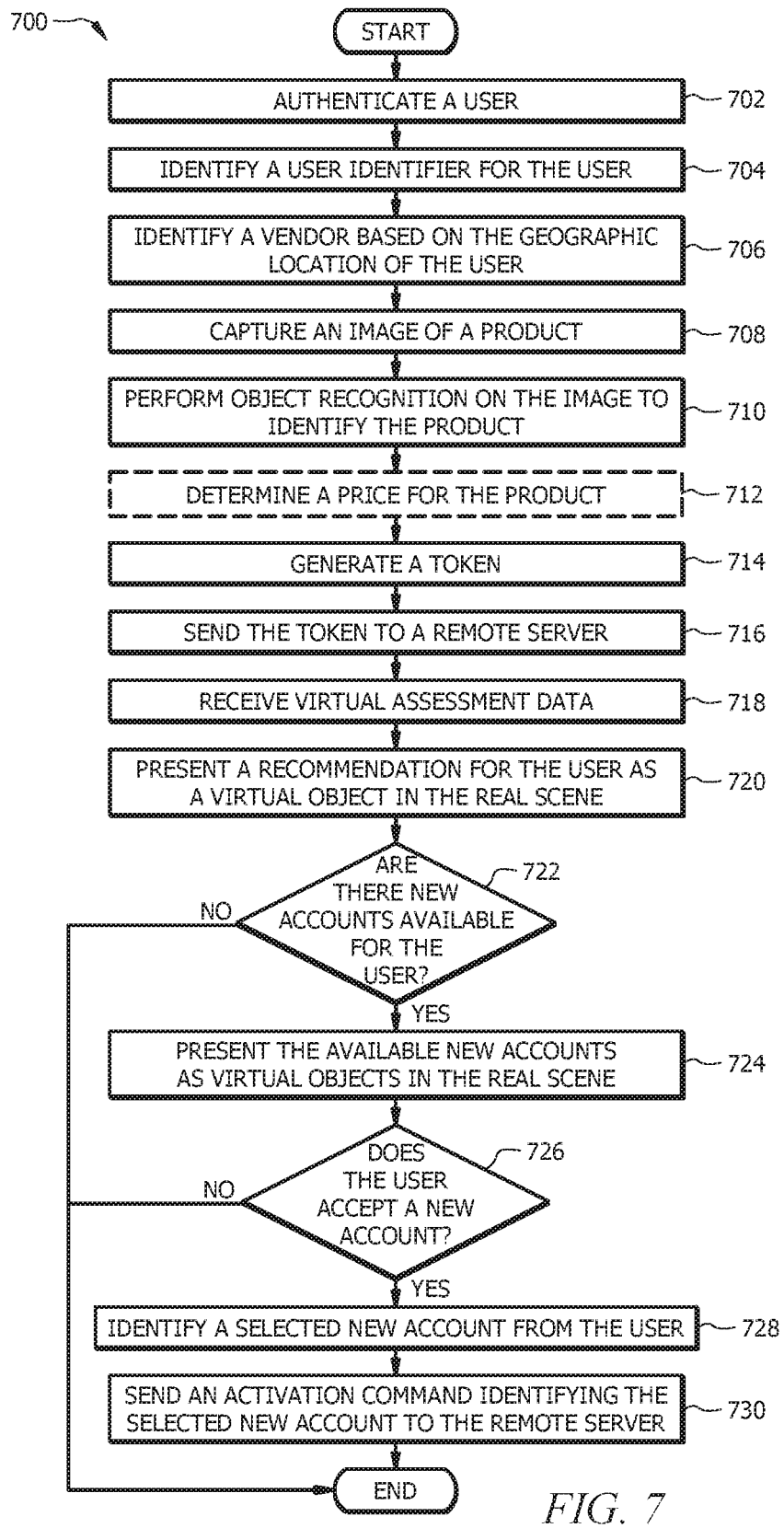
FIG. 7 is a flowchart of another embodiment of an augmented reality overlaying method.
Figure 8:
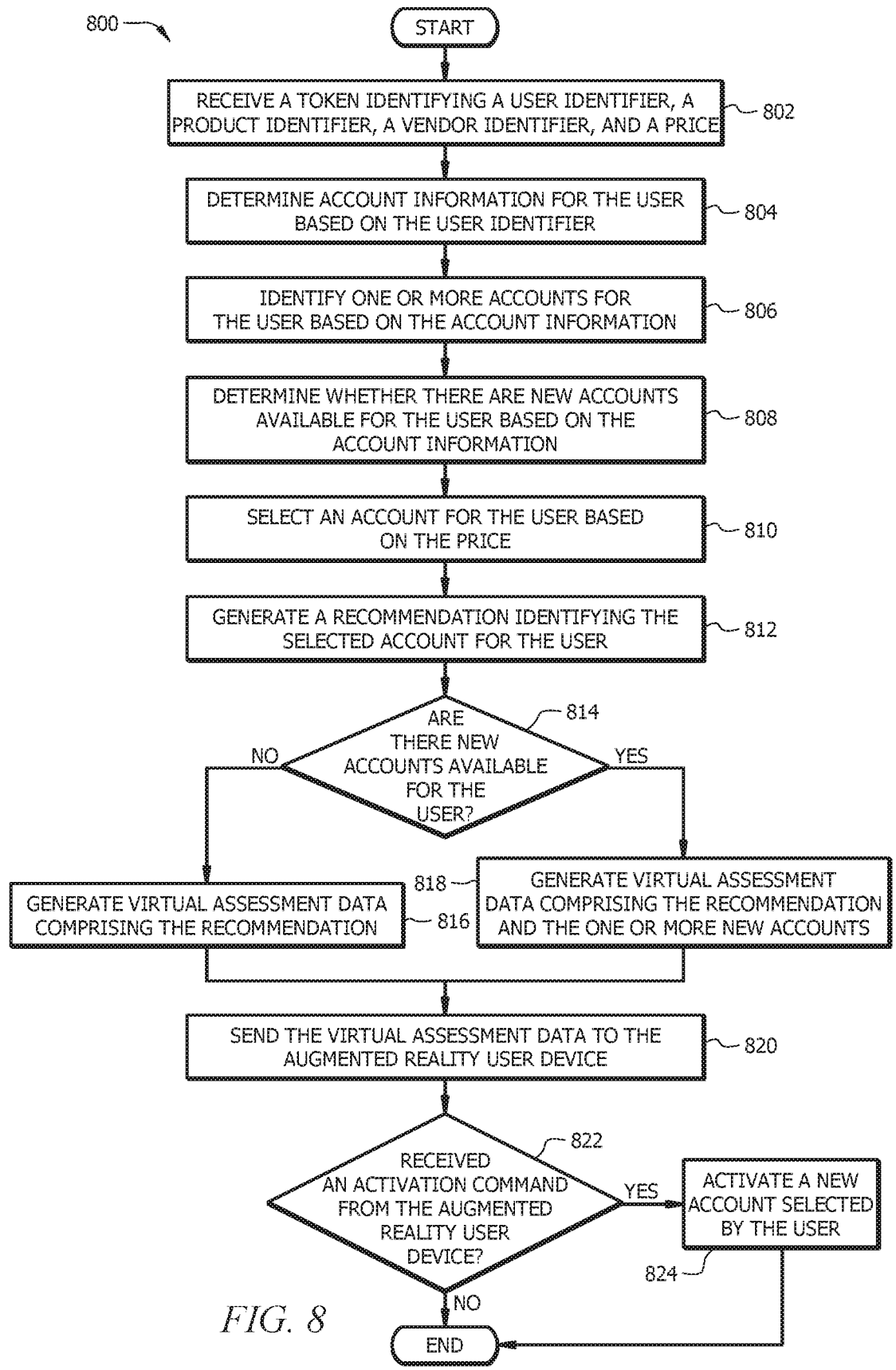
FIG. 8 is a flowchart of another embodiment of an augmented reality overlaying method.
Figure 10:
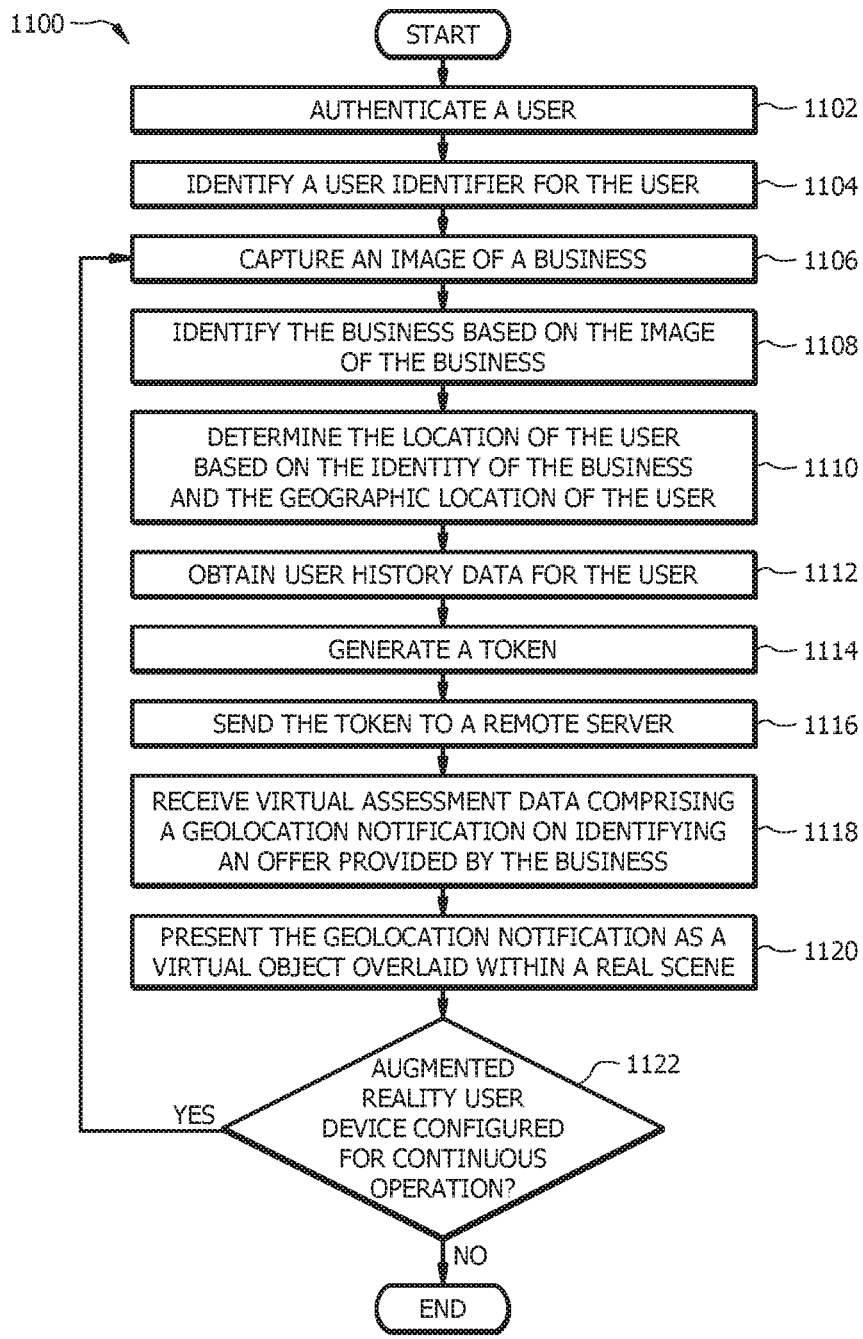
FIG. 10 is a flowchart of another embodiment of an augmented reality overlaying method.
Figure 11:
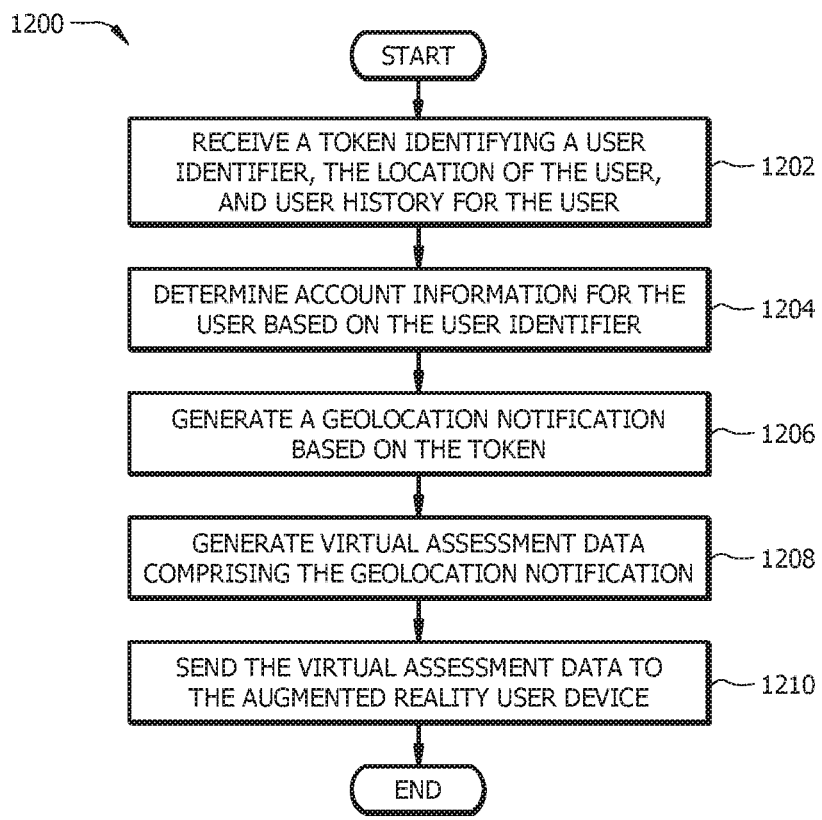
FIG. 11 is a flowchart of another embodiment of an augmented reality overlaying method.

FIGS. 2 and 3 provide examples of a first person view of what a user might see when using the augmented reality user device to view virtual objects overlaid with tangible objects. FIG. 4 is an embodiment of how an augmented reality user device may be configured and implemented. FIGS. 5, 7, and 10 are examples of a process for facilitating augmented reality overlays with tangible objects using an augmented reality user device. FIGS. 6, 8, and 11 are examples of a process for facilitating augmented reality overlays with tangible objects with a remote server.

FIG. 1 is a schematic diagram of an embodiment of an augmented reality system 100 configured to overlay virtual objects with a real scene. The augmented reality system 100 comprises an augmented reality user device 400 in signal communication with a remote server 102 and one or more third-party databases 118 via a network 104. The augmented reality user device 400 is configured to employ any suitable connection to communicate data with the remote server 102. In FIG. 1, the augmented reality user device 400 is configured as a head-mounted wearable device. Other examples of wearable devices are integrated into a contact lens structure, an eye glass structure, a visor structure, a helmet structure, or any other suitable structure. In some embodiments, the augmented reality user device 400 may be integrated with a mobile user device. Examples of mobile user devices include, but are not limited to, a mobile phone, a computer, a tablet computer, and a laptop computer. For example, the user 106 may use a smart phone as the augmented reality user device 400 to overlay virtual objects with a real scene. Additional details about the augmented reality user device 400 are described in FIG. 4.

Examples of an augmented reality user device 400 in operation are described below and in FIGS. 5, 7, and 10. The augmented reality user device 400 is configured to identify and authenticate a user 106 and to provide a user identifier 108 that identifies the user 106. The user identifier 108 is a label or descriptor (e.g. a name based on alphanumeric characters) used to identify the user 106. The augmented reality user device 400 is configured to use one or more mechanisms such as credentials (e.g. a log-in and password) or biometric signals to identify and authenticate the user 106.

The augmented reality user device 400 is configured to identify the location of the user 106. In one embodiment, the augmented reality user device 400 identifies the location of the user 106 based on the geographic location of the user 106. For example, the augmented reality user device 400 uses geographic location information provided by a global position system (GPS) sensor with a map database to determine the location of the user 106. In another embodiment, the augmented reality user device 400 is configured to use object recognition and/or optical character recognition to identify the location of the user 106. For example, the augmented reality user device 400 is configured to identify the location of the user 106 based on the identification of buildings, structures, landmarks, branding, signs, logo, and/or any other types of objects around the user. In other embodiments, the augmented reality user device 400 determines the location of the user 106 based on any other information and/or using any other suitable technique as would be appreciated by one of ordinary skill in the art.

The augmented reality user device 400 is configured to identify tangible objects 150 in front of the user 106. For example, the augmented reality user device 400 is configured to identify products in a shopping cart 152. The augmented reality user device 400 is configured to use object recognition and/or optical character recognition to identify objects 150. In one embodiment, the augmented reality user device 400 is configured to capture an image 407 of an object 150 and to perform object recognition and/or optical character recognition on the image 407 of the object 150 to identify the object 150. The augmented reality user device 400 is configured to identify an object 150 based on the size, shape, features, and/or any other characteristics of the object 150. For example, the augmented reality user device 400 identifies the object 150 based on branding, text, or logos on the object 150 or its packaging. The augmented reality user device 400 identifies the object 150 based on any other characteristics of the object 150 or using any other suitable technique as would be appreciated by one of ordinary skill in the art. The augmented reality user device 400 uses object recognition and/or optical character recognition which allows the user 106 to quickly and efficiently identify the objects 150 compared to other systems where the user 106 has to manually identify each of the objects 150.

The augmented reality user device 400 is further configured to determine a price for an object 150 or a price for one or more objects 150. In one embodiment, the augmented reality user device 400 accesses a third-party database 118 to determine the price for each of the objects 150. For example, the augmented reality user device 400 queries a third-party database 118 linked with a vendor of the one or more objects 150 to determine the price of the one or more objects 150. In one embodiment, the augmented reality user device 400 sends a message 113 identifying the one or more objects 150 to the third-party database 118. For example, the message 113 comprises descriptors for the objects 150. Examples of descriptors include, but are not limited to, images 407 of the objects 150, names, barcodes, object descriptors (e.g. type, size, or weight), and/or any other suitable descriptor for identifying the objects 150.

In another embodiment, the augmented reality user device 400 determines the price of the objects 150 using barcodes, quick response (QR) codes, digital watermarks, or price tags associated with the objects 150. For example, the augmented reality user device 400 identifies price tags on the objects 150 and determines the price of the objects 150 based on their price tags. As another example, the augmented reality user device 400 identifies price tags on the shelves when the user 106 picks up an object 150. In another embodiment, the augmented reality user device 400 determines the total price of the objects 150 based on an input provided by the user 106. The augmented reality user device 400 is configured to receive an indication of prices for the objects 150 from the user 106 as a voice command, a gesture, an interaction with a button on the augmented reality user device 400, or in any other suitable form. For example, the augmented reality user device 400 receives voice commands from the user 106 as the user 106 states the prices of each of the objects 150. In other examples, the augmented reality user device 400 determines the price of the objects 150 using any other suitable technique as would be appreciated by one of ordinary skill in the art.

The augmented reality user device 400 is configured to generate a token 110 for requesting information for the user 106. In one embodiment, the token 110 comprises a user identifier 108 for the user 106, one or more product identifiers 115, a vendor identifier 117, and a price 109 corresponding with the product identifiers 115. The one or more product identifiers 115 identify one or more objects 150. The vendor identifier 117 identifies where the user 106 is located. For example, the product identifiers 115 identify several groceries and a vendor identifier 117 identifies a grocery store. As another example, the product identifiers 115 identify office supplies and a vendor identifier 117 identifies an office supply store. In other embodiments, the token 110 identifies any other information or combination of information.

The augmented reality user device 400 is configured to send the token 110 to the remote server 102. In one embodiment, the augmented reality user device 400 is configured to encrypt and/or encode the token 110 prior to sending the token 110 to the remote server 102. The augmented reality user device 400 employs any suitable encryption and/or encoding technique as would be appreciated by one of ordinary skill in the art.

The augmented reality user device 400 is further configured to receive virtual assessment data 111 from the remote server 102 in response to sending the token 110 to the remote server 102. The augmented reality user device 400 is configured to process the virtual assessment data 111 to access the information provided by the remote server 102. The virtual assessment data 111 comprises information related to account information for the user 106, recommendations for the user 106, available offers for the user 106, and/or any other information for the user 106.

The augmented reality user device 400 is configured to present information from the received virtual assessment data 111 as one or more virtual objects overlaid with the tangible objects 105 in the real scene in front of the user 106. For example, the augmented reality user device 400 presents account information for the user 106 and a recommendation identifying one of the user's 106 accounts as virtual objects overlaid with the objects 150 in front of the user 106. Examples of the augmented reality user device 400 presenting information as virtual objects overlaid with the objects 150 in front of the user 106 are described in FIGS. 2 and 3. Using virtual objects overlaid, the augmented reality user device 400 provides a head-up display that allows the user 106 to view their personal information while simultaneously looking at other objects in front of the user 106.

The augmented reality user device 400 is configured to determine whether there are any offers available for the user 106. In one embodiment, the augmented reality user device 400 determines there are offers available for the user 106 based on the presence of the offers in the received virtual assessment data 111. The augmented reality user device 400 is configured to present available offers for the user 106 as virtual objects overlaid with the objects 150 in front of the user 106. For example, the augmented reality user device 400 overlays a virtual object identify an offer for a product with the actual product in the real scene. The augmented reality user device 400 allows the user 106 to quickly identify offers in the context of the real scene. Other systems are unable to link offers with actual products which forces a shopper to manually determine which offers apply to which products.

In one embodiment, one or more of the available offers involves activation by the user 106 in order to be used by the user 106. The augmented reality user device 400 is further configured to determine whether the user 106 selects an offer to activate. The user 106 selects or identifies an offer from among the one or more available offers when the user 106 wants to activate the offer. The augmented reality user device 400 is configured to receive an indication of the selected offer from the user 106 as a voice command, a gesture, an interaction with a button on the augmented reality user device 400, or in any other suitable form. The augmented reality user device 400 is configured to send an activation command 128 identifying the selected offer to the remote server 102 to activate the offer. The augmented reality user device 400 allows the both see available offers and accept one or more offers while simultaneously looking at other objects in front of the user 106. This allows the user 106 to continue other activities without interruption.

The network 104 comprises a plurality of network nodes configured to communicate data between the augmented reality user device 400 and one or more servers 102 and/or third-party databases 118. Examples of network nodes include, but are not limited to, routers, switches, modems, web clients, and web servers. The network 104 is configured to communicate data (e.g. tokens 110 and virtual assessment data 111) between the augmented reality user device 400 and the server 102. Network 104 is any suitable type of wireless and/or wired network including, but not limited to, all or a portion of the Internet, the public switched telephone network, a cellular network, and a satellite network. The network 104 is configured to support any suitable communication protocols as would be appreciated by one of ordinary skill in the art upon viewing this disclosure.

The server 102 is linked to or associated with one or more institutions. Examples of institutions include, but are not limited to, organizations, businesses, government agencies, financial institutions, and universities, among other examples. The server 102 is a network device comprising one or more processors 112 operably coupled to a memory 114. The one or more processors 112 are implemented as one or more central processing unit (CPU) chips, logic units, cores (e.g. a multi-core processor), field-programmable gate array (FPGAs), application specific integrated circuits (ASICs), or digital signal processors (DSPs). The one or more processors 112 are communicatively coupled to and in signal communication with the memory 114. The one or more processors 112 are configured to process data and may be implemented in hardware or software. The one or more processors 112 are configured to implement various instructions. For example, the one or more processors 112 are configured to implement a product analysis engine 116. In an embodiment, the product analysis engine 116 is implemented using logic units, FPGAs, ASICs, DSPs, or any other suitable hardware.

Examples of the product analysis engine 116 in operation are described in detail below and in FIGS. 6 and 8. In one embodiment, the product analysis engine 116 is configured to receive a token 110 and to process the token 110 to identify a user identifier 108 for the user 106, one or more product identifiers 115 identifying one or more objects 150, a vendor identifier 117 identifying a vendor, a price 109 for the one or more objects 150, and/or any other information. In one embodiment, processing the token 110 comprises decrypting and/or decoding the token 110 when the token 110 is encrypted or encoded by the augmented reality user device 400. The product analysis engine 116 employs any suitable decryption or decoding technique as would be appreciated by one of ordinary skill in the art.

The product analysis engine 116 is configured to use the user identifier 108 to look-up and identify account information for the user 106 in an account information database 120. The account information comprises one or more accounts (e.g. payment accounts), budgeting information, transaction history, membership information (e.g. loyalty or reward program memberships), and/or any other information linked with the user 106. Examples of accounts include, but are not limited to, checking accounts, savings accounts, investment accounts, credit card accounts, lines of credit, and any other suitable type of account. Budgeting information comprises one or more budgets with recommended or user-defined spending limits for the user 106. For example, the budgeting information comprises a grocery budget, a clothing budget, a restaurant budget, and/or any other kind of budget.

The product analysis engine 116 is configured to determine whether there are any available offers for the user 106 based on information provided by the token 110 and/or the account information for the user 106. Examples of offers include, but are not limited to, promotions, coupons, in-store credit, vouchers, rebates, membership points, reward points, air travel miles, free product vouchers, and/or any other kind of offer. In one embodiment, the product analysis engine 116 is configured to use the user identifier 108 and/or the account information for the user 106 to query an offers database 122 for any available offers for the user 106. For example, the product analysis engine 116 uses the user identifier 108 to look-up and identify offers that are available for the user 106.

In another embodiment, the product analysis engine 116 is configured to send a data request 126 comprising information provided by the token 110 and/or account information for the user 106 to one or more third-party databases 118 to query the third-party databases 118 for available offers for the user 106. For example, a third-party database 118 is linked with the vendor identified by the vendor identifier 117 and provides available offers from the vendor in response to the data request 126. In one embodiment, the data request 126 comprises the user identifier 108, account information for the user 106, information provided by the token 110, any other information linked with the user 106, or combinations of information.

The product analysis engine 116 is configured to generate personalized recommendations for the user 106 based on the information provided by the token 110 and account information for the user 106. For example, the product analysis engine 116 generates recommendations that save the user 106 money, earns the most rewards or loyalty points, keeps the user 106 on budget, prevents the user 106 from over-drafting, and/or provides any other kinds of benefits for the user 106. As an example, a recommendation identifies one of the user's 106 accounts for a transaction. In this example, the product analysis engine 116 generates the recommendation that prevents the user 106 from over-drafting or incurring fees. As another example, a recommendation identifies one or more offers available to the user 106 for a transaction. In this example, the product analysis engine 116 generates the recommendation that earns the most reward points or provides a discount for the user 106. As another example, a recommendation indicates for the user 106 to remove one or more objects 150 to avoid going over budget or over-drafting. In one embodiment, the product analysis engine 116 generates a recommendation for the user 106 based on the user's 106 account information and/or the available offers for the user 106. For example, the product analysis engine 116 generates a recommendation based on account balances, budget information for the user 106, reward points that will be earned, coupons that can be applied, and/or any other criteria.

The product analysis engine 116 is configured to generate virtual assessment data 111 that comprises a recommendation, account information for the user 106, one or more available offers for the user 106, alternative vendors with alternative prices, historical pricing information for a product, and/or any other information for the user 106. The virtual assessment data 111 comprises information to be presented to the user 106 as one or more virtual objects. The product analysis engine 116 sends the virtual assessment data 111 to the augmented reality user device 400.

The product analysis engine 116 is further configured to receive an activation command 128 identifying a selected offer by the user 106. The product analysis engine 116 is configured to identify the selected offer and to facilitate activating the selected offer for the user 106. For example, the product analysis engine 116 is configured to exchange messages with a third-party database 118 to activate the selected offer for the user 106. Once an offer is activated, the user 106 may redeem or use the selected offer. In one embodiment, the product analysis engine 116 is configured to send virtual assessment data 111 to the augmented reality user device 400 that indicates the selected offer has been activated.

The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise read-only memory (ROM), random-access memory (RAM), ternary content-addressable memory (TCAM), dynamic random-access memory (DRAM), and static random-access memory (SRAM). The memory 114 is operable to store an account information database 120, offers database 122, product information database 123, product analysis instructions 124, and/or any other data or instructions. The product analysis instructions 124 comprise any suitable set of instructions, logic, rules, or code operable to execute the product analysis engine 116.

The account information database 120 comprises account information for the user 106. Account information includes, but is not limited to, personal information, credit scores, credit history, institution names, account names, account balances, account types, budget information, rewards points, member benefits, transaction history, and payment history.

The offers database 122 is configured to store offers for the user 106, vendors, and/or one or more products. In one embodiment, the offers database 122 is configured to receive offers from one or more third-party databases 118. In other embodiments, the offers database 122 is configured to generate offers for the user 106. Examples of offers include, but are not limited to, promotions, coupons, in-store credit, vouchers, rebates, membership points, reward points, air travel miles, free product vouchers, and/or any other kind of offer. In some embodiments, an offer involves activation by the user 106 prior to using the offer. For example, the offer becomes valid in response to the user 106 accepting the offer. Offers are linked with and can be identified using account information for the user 106, user identifiers 108, product identifiers 115, and/or vendor identifiers 117. For example, the offers database 122 uses a user identifier 108 to look-up and identify offers available for the user 106. In an other example, the offers database 122 uses product identifiers 115 to look-up and identify offers linked with one or more products. In another example, the offers database 122 uses a vendor identifier 117 to look-up and identify offers linked with a particular vendor. In other examples, the offers database 122 uses any other information to look-up and identify offers for the user 106.

The product information database 123 is configured to store product information for various objects 150. In one embodiment, the product information comprises product reviews, product descriptions, warranty information, historical pricing information, seasonal pricing information, secondary costs (e.g. insurance costs and maintenance costs), demographic information about other people who purchased a similar product, information about other models of a product, alternative products, alternative vendors with alternative prices for a product, any other information, or combination of information. In one embodiment, the product analysis engine 116 is configured to use product identifiers 115 to look-up and identify product information. For example, the product analysis engine 116 uses a product identifier 115 to identify alternative vendors with alternative pricing for a product linked with the product identifier 115. In some embodiments, the product analysis engine 116 is configured to send a data request 126 comprising a product identifier 115 to a third-party database 118 to request product information.

In an embodiment, the account information database 120, the offers database 122, and/or the product information database 123 are stored in a memory external of the server 102. For example, the server 102 is operably coupled to a remote database storing the account information database 120, the offers database 122, and/or the product information database 123.

In one embodiment, the server 102 is in signal communication with one or more third-party databases 118. Third-party databases 118 are databases owned or managed by a third-party source. Examples of third-party sources include, but are not limited to, vendors, institutions, loyalty programs, and businesses. In one embodiment, the third-party databases 118 are configured to store account information for the user 106, offers for the user 106, offers for one or more products, offers for a vendor, mapping information, product information, vendor information, tax information, and/or any other information. In one embodiment, third-party databases 118 are configured to push (i.e. send) data to the server 102. The third-party database 118 is configured to send information (e.g. offers) to the server 102 with or without receiving a data request for the information. The third-party database 118 is configured to send data periodically to the server 102, for example, hourly, daily, or weekly. For example, the third-party database 118 is associated with a vendor and is configured to push offers linked the vendor and/or products sold by the vendor to the server 102 hourly.

In another embodiment, a third-party database 118 is configured to receive a data request 126 for information or offers linked with a vendor, one or more products, and/or the user 106 from the server 102. The third-party database 118 is configured to send the requested information back to the server 102. For example, a third-party database 118 is configured to receive a data request 126 comprising a user identifier 108 for the user 106. The third-party database 118 is configured to use the user identifier 108 to look-up offers available for the user 106 within the records of the third-party database 118. In another example, a third-party database 118 is configured to receive a data request 126 comprising a product identifier 115. The third-party database 118 is configured to use the product identifier 115 linked with a product to look-up offers for the product within the records of the third-party database 118. In other examples, third-party databases 118 are configured to use any information provided to the server 102 to look-up offers linked with a vendor, one or more products, and/or the user 106.

In one embodiment, the third-party databases 118 are configured to receive a message 113 comprising descriptors for one or more objects 150 from the augmented reality user device 400. The third-party databases 118 are configured to use the descriptors to look-up prices for the one or more objects 150 linked with the descriptors. The third-party databases 118 are configured to send prices for the one or more objects 150 to the augmented reality user device 400.

The following is a non-limiting example of how the augmented reality system 100 may operate when a user 106 is looking at several products in a store. In this example, a user 106 is using the augmented reality user device 400 in a store (e.g. a grocery store). The user 106 authenticates themselves before using the augmented reality user device 400 by providing credentials (e.g. a log-in and password) and/or a biometric signal. The augmented reality user device 400 authenticates the user 106 based on the user's input and allows the user 106 to generate and send tokens 110. The augmented reality user device 400 identifies the user 106 and a user identifier 108 for the user 106 upon authenticating the user 106. Once the user 106 has been authenticated, the user identifier 108 is used by other systems and devices (e.g. remote server 102 or a third-party database 118) to identify and authenticate the user 106 without requiring the user 106 to provide additional credentials for each system.

Once the user 106 is authenticated, the augmented reality user device 400 identifies the location of the user 106, for example, the store where the user 106 is shopping. In one embodiment, the augmented reality user device 400 identifies the location of the user 106 based on the geographic location of the user 106. For example, the augmented reality user device 400 uses geographic location information provided by a GPS sensor with a map database (e.g. a third-party database 118) to determine the location of the user 106 and to identify the store where the user 106 is shopping. In another embodiment, the augmented reality user device 400 uses object recognition and/or optical character recognition to identify the store. For example, the augmented reality user device 400 identifies the store based on structures, branding, signs, and/or logos within the store. In other embodiments, the augmented reality user device 400 identifies the store using any other suitable technique.

The user 106 looks at objects 150 (e.g. products) in a shopping cart 152 with the augmented reality user device 400. The augmented reality user device 400 captures an image 407 of the objects 150 in the shopping cart 152 and performs object recognition and/or optical character recognition on the captured image 407 to identify the objects 150 in the shopping cart 152. For example, the augmented reality user device 400 identifies the objects 150 based on the size and shape of the objects 150 or based on text or logos on their packaging.

The augmented reality user device 400 determines the price of the objects 150 in the shopping cart 152. In one embodiment, the augmented reality user device 400 accesses a third-party database 118 linked with the store to determine the price of the objects 150. For example, the augmented reality user device 400 queries the third-party database 118 using descriptors for the identified objects 150 in the shopping cart 152. In another embodiment, the augmented reality user device 400 determines a price of the objects 150 by identifying barcodes, QR codes, digital watermarks, or price tags associated with the objects 150. For example, the augmented reality user device 400 identifies price tags on the objects 150. As another example, the augmented reality user device 400 identifies a price tag on a shelf for an object 150 when the user 106 picks up the object 150.

The augmented reality user device 400 generates a token 110 and sends the token 110 to the remote server 102. In one embodiment, the augmented reality user device 400 generates a token 110 comprising the user identifier 108 for the user 106, a vendor identifier 117 identifying the store where the user 106 is located, product identifiers 115 identifying the objects 150 in the shopping cart 152, and the price of the objects 150. In other embodiments, the token 110 comprises any other suitable information or combinations of information. The augmented reality user device 400 encrypts and/or encodes the token 110 prior to sending the token 110 to the remote server 102.

The server 102 receives the token 110 and processes the token 110 to identify the user identifier 108, the vendor identifier 117, the product identifiers 115, and the price of the objects 150. The server 102 decrypts or decodes the token 110 when the token 110 is encrypted or encoded by the augmented reality user device 400. The server 102 uses the user identifier 108 to look-up account information and/or accounts for the user 106 in the account information database 120. The server 102 is configured to use the user identifier 108 to identify one or more accounts for the user 106.

In one embodiment, the server 102 uses the user identifier 108 to identify budget information for the user 106 in the account information database 120. The budget information comprises one or more budgets identifying recommended or user-defined spending limits for the user 106. For example, the server 102 identifies one or more stored budgets for the user 106, for example, a grocery budget, a clothing budget, a restaurant budget, and/or any other kinds of budgets. In one embodiment, the server 102 determines how the user's 106 accounts and budgets are impacted by purchasing the products linked with the product identifiers 115 based on the price 109 indicated in the token 110.

The server 102 determines whether there are any offers available for the user 106 based on the user's 106 account information, the location of the user 106 (e.g. the vendor identifier 117), and/or the products in the user's 106 shopping cart 152. In one embodiment, the server 102 queries the offers database 122 for any available offers based on the user's 106 account information. For instance, the server 102 queries the offers database 122 to determine whether the user 106 has reward points or discounts that can be applied to one or more of the products in the user's 106 shopping cart 152. In another embodiment, the server 102 sends a data request 126 to one or more third-party databases 118 to query the one or more third-party databases 118 for available offers based on the user's 106 identity (e.g. the user identifier 108), the products in the user's 106 shopping cart 152 (e.g. the product identifiers 115), and/or the store where the user 106 is shopping (e.g. the vendor identifier 117). For instance, a third-party database 118 linked with the store identified by the vendor identifier 117 and provides coupons or discounts for one or more of the products in the user's shopping cart 152.

The server 102 generates a personalized recommendation for the user 106 based on the user's 106 account information and/or available offers for the user 106. As an example, the server 102 generates a recommendation that identifies one of the user's 106 accounts for a transaction to purchase the products in the user's 106 shopping cart 152. As another example, the server 102 generates a recommendation that identifies one or more offers (e.g. coupons) that can be automatically applied. As another example, the server 102 generates a recommendation that identifies one or more offers that can be applied after activation. In another embodiment, the recommendation may indicate for the user 106 to remove one or more products from their shopping cart 152. For example, the server 102 may determine based on the price 109 indicated in the token 110 that purchasing the current products 150 will exceed the user's 106 budget or overdraft the user's 106 account. The server 102 is configured to make other suitable kind of recommendation.

The server 102 generates virtual assessment data 111 that comprises the recommendation, account information for the user 106, one or more available offers for the user 106, and/or any other information. For example, the server 102 generates virtual assessment data 111 that comprises the account information and one or more available offers for the user 106. In this example, the virtual assessment data 111 identifies different accounts available for the user 106 and one or more available offers the user 106 may be interested in. As another example, the server 102 generates virtual assessment data 111 that comprises account information and budgeting information for the user 106. In this example, the virtual assessment data 111 identifies different accounts available for the user 106 and how the user's 106 budget is affected by purchasing the products in the user's shopping cart 152. As another example, the server 102 generates virtual assessment data 111 that comprises account information and a recommendation identifying one of the user's 106 accounts. In this example, the virtual assessment data 111 identifies different accounts available for the user 106 and recommends an account that provides some benefit to the user 106 if used for the transaction. In other examples, the server 102 generates virtual assessment data 111 comprising any other type and/or combination of information. The server 102 sends the virtual assessment data 111 to the augmented reality user device 400.

The augmented reality user device 400 receives the virtual assessment data 111 and processes the virtual assessment data 111 to access the information provided by the server 102. In one embodiment, the augmented reality user device 400 presents account information and a recommendation identifying one of the user's 106 account as virtual objects overlaid with tangible objects in a real scene in front of the user 106 in real time. In other embodiments, the augmented reality user device 400 presents recommendations, account information, available offers for the user 106, and/or any other information as virtual objects overlaid with tangible objects in the real scene in front of the user 106. Examples of the augmented reality user device 400 presenting information to the user 106 as virtual objects overlaid with tangible objects in a real scene in front of the user 106 are described in FIGS. 2 and 3.

The augmented reality user device 400 determines whether there are any offers available for the user 106. In one embodiment, the augmented reality user device 400 determines there are offers available for the user 106 based on the presence of the offers in the virtual assessment data 111. The augmented reality user device 400 presents the offers to the user 106 as a virtual object overlaid with tangible objects in the real scene in front of the user 106. When the augmented reality user device 400 presents the one or more available offers, the augmented reality user device 400 determines whether the user 106 selects an offer to activate. The augmented realty user device 400 receives the indication of the selected offer from the user 106 as a voice command, a gesture, an interaction with a button on the augmented reality user device 400, or in any other suitable form. The augmented reality user device 400 is configured to send an activation command 128 identifying the selected offer to the remote server 102.

The server 102 receives the activation command 128 identifying the selected offer and facilitates the activation of the selected offer for the user 106. For example, the server 102 exchanges messages with a third-party database 118 to activate the selected offer for the user 106. In one embodiment, the server 102 sends virtual assessment data 111 to the augmented reality user device 400 that indicates the selected offer has been activated. The activation notification may be presented to the user 106 by the augmented reality user device 400 as a virtual object.

FIG. 2 is an embodiment of a first person view from a display 408 of an augmented reality user device 400 overlaying virtual objects 202 onto tangible objects 204 within a real scene 200. Examples of tangible objects 204 include, but are not limited to, products, buildings, floors, walls, shelves, furniture, people, or any other physical objects. In FIG. 2, a user 106 is shopping in a store using the augmented reality user device 400. The user 106 has several objects 150 (e.g. groceries) in a shopping cart 152. The user 106 employs the augmented reality user device 400 to determine the price of the objects 150 within the shopping cart 152, to identify one or more offers available to the user 106, to receive account information for the user 106, to receive a recommendation based on the objects 150 within the shopping cart 152, and/or to receive any other information based on the user 106, the location of the user 106, or the objects 150 within the shopping cart 152.

For example, the user 106 uses the augmented reality user device 400 to determine the price of the objects 150 in the shopping cart 152. The augmented reality user device 400 identifies the objects 150 in the shopping cart 152 and determines a price of the objects 150 in the shopping cart 152. In one embodiment, the augmented reality user device 400 queries a third-party database 118 using descriptors for the objects 150 to determine the price of the objects 150. In one embodiment, the augmented reality user device 400 presents the determined price of the objects 150 as a virtual object 206 in the real scene 200 in front of the user 106 using the display 408 of the augmented reality user device 400.

Additionally, the user 106 uses the augmented reality user device 400 to obtain account information for the user 106 and to determine whether there are any available offers for the user 106. In one embodiment, the augmented reality user device 400 generates a token 110 comprising a user identifier 108 for the user 106, product identifiers 115 for the objects 150, and a vendor identifier 117 identifying the location where the user 106 is shopping. The augmented reality user device 400 sends the token 110 to the remote server 102 to request account information for the user 106 and to identify any available offers for the user 106. The account information for the user 106 and available offers for the user 106 may be determined based on information from multiple sources. For example, account information for the user 106 is stored in the sever 102 and information about available offers is stored in one or more third-party databases 118. In other examples, account information and information about available offers may be located in any other sources and/or combinations of sources. Tokens 110 allow the augmented reality user device 400 to make a single request regardless of the number of sources used to compile the requested information. Using a single request improves the efficiency of the system compared to other systems that make individual requests to each source. Additionally, the augmented reality user device 400 is able to request information without knowledge of which sources or how many sources need to be queried for the information.

In response to sending the token 110, the augmented reality user device 400 receives virtual assessment data 111 from the remote server 102. In one embodiment, the virtual assessment data 111 comprises account information for the user 106 and a recommendation for the user 106. The virtual assessment data 111 may also identify offers available to the user 106. In FIG. 2, the account information includes the user's 106 accounts and budget information. The augmented reality user device 400 presents the user's 106 account information as a virtual object 208 overlaid with the real scene 200 in front of the user 106. In this example, the virtual object 208 presents two accounts for the user 106. The augmented reality user device 400 presents the budget information as another virtual object 210 overlaid with the real scene 200 in front of the user 106. The virtual object 210 presents the budget information to illustrate the current status of the user's 106 budget. In this example, the user's 106 accounts are shown as a list and the budget information is shown as a pie chart. However, in other examples the user's 106 accounts and the budget information may be presented in any other suitable form. In this example, the virtual object 208 presenting the user's 106 accounts also presents the recommendation for the user 106. For example, the virtual object 208 presents a recommendation identifying for the user 106 to use the first account in the list of accounts. The augmented reality user device 400 uses any suitable technique to identify or present a recommendation to the user 106. For example, the augmented reality user device 400 presents a virtual object with just a recommendation.

The augmented reality user device 400 presents the available offers for the user 106 as a virtual object 212. In this example, two offers are presented to the user 106. Any number of offers may be presented to the user 106. In other examples, the augmented reality user device 400 presents any other information linked with the user 106, the objects 150, and/or the vendor.

The following is another non-limiting example of how the augmented reality system 100 may operate when the user 106 is looking at medium to high price product at a store or dealership. In this example, a user 106 is using the augmented reality user device 400 in a store. The user 106 authenticates themselves before using the augmented reality user device 400 by providing credentials (e.g. a log-in and password) or a biometric signal. The augmented reality user device 400 authenticates the user 106 based on the user's input and allows the user 106 to generate and send tokens 110. The augmented reality user device 400 identifies the user 106 and a user identifier 108 for the user 106 upon authenticating the user 106. Once the user 106 has been authenticated, the user identifier 108 may be used by other systems and devices (e.g. remote server 102 or a third-party database 118) to identify and authenticate the user 106 without requiring the user 106 to provide additional credentials for each system.

Once the user 106 is authenticated, the augmented reality user device 400 identifies the location of the user, for example, the store where the user 106 is shopping. In one embodiment, the augmented reality user device 400 identifies the location of the user 106 based on the geographic location of the user 106 similar to as described in previous examples. In another embodiment, the augmented reality user device 400 uses object recognition and/or optical character recognition to identify the store similar to as described in previous examples. In other embodiments, the augmented reality user device 400 identifies the store using any other suitable technique.

In this example, the user 106 looks at an appliance (e.g. a washer) with the augmented reality user device 400. The augmented reality user device 400 captures an image 407 of the appliance and performs object recognition and/or optical character recognition on the captured image 407 to identify the appliance. For example, the augmented reality user device 400 identifies the appliance based on the size and shape of the appliance and/or based on text or logos on its packaging.

The augmented reality user device 400 determines the price for the appliance. In one embodiment, the augmented reality user device 400 accesses a third-party database 118 linked with the store to determine the price for the appliance. For example, the augmented reality user device 400 queries the third-party database 118 using descriptors for the identified appliance. In another embodiment, the augmented reality user device 400 determines a price of the appliance by identifying barcodes, QR codes, digital watermarks, or price tags associated with the appliance. For example, the augmented reality user device 400 identifies a price tag on the appliance. As another example, the augmented reality user device 400 identifies a price tag on a shelf proximate to the appliance.

The augmented reality user device 400 generates a token 110 and sends the token 110 to the remote server 102. In one embodiment, the augmented reality user device 400 generates a token 110 comprising the user identifier 108 for the user 106, a vendor identifier 117 identifying the store where the user 106 is located, a product identifier 115 identifying the appliance, and the price of the appliance. In other embodiments, the token 110 comprises any other suitable information or combinations of information. The augmented reality user device 400 encrypts and/or encodes the token 110 prior to sending the token 110 to the remote server 102.

The server 102 receives the token 110 and processes the token 110 to identify the user identifier 108, the vendor identifier 117, the product identifier 115, and the price of the appliance. The server 102 decrypts or decodes the token 110 when the token 110 is encrypted or encoded by the augmented reality user device 400. The server 102 uses the user identifier 108 to look-up account information and accounts for the user 106 in the account information database 120.

In one embodiment, the server 102 determines whether there are any new accounts available for the user 106 based on the user's account information, the location of the user 106 (e.g. the vendor identifier 117), and/or the appliance (e.g. the product identifier 115). Examples of new accounts include, but are not limited to, credit cards, loans, lines of credit, and any other financing options. For example, the server 102 identifies lines of credit or loans available to the user 106 based on their account information (e.g. credit score). In this example, the server 102 prequalifies the user 106 for a new line a credit based on their account information. As another example, the server 102 identifies a new credit card available to the user 106 based on the location of the user 106 and account information for the user 106. In this example, the server 102 identifies new accounts for the user 106 that are specific to the location of the user 106 and that the user 106 qualifies for. For instance, a vendor specific loyalty program account or a credit card account.

In one embodiment, the server 102 queries one or more third-party databases 118 for available new accounts based on the user's 106 identity (e.g. the user identifier 108), the appliance (e.g. the product identifiers 115), and/or the store where the user 106 is shopping (e.g. the vendor identifier 117). For instance, a third-party database 118 linked with the store identified by the vendor identifier 108 and provides information related to lines of credit accounts, financing option accounts, and/or loyalty program accounts.

In one embodiment, the server 102 obtains information related to other models or alternatives for the appliance. For example, the server 102 uses the product identifier 115 to identify other similar appliances in the product information database 123. As another example, the sever 102 sends a data request 126 with the product identifier 115 to a third-party database 118 to request information for other similar appliances. The server 102 receives information about other similar appliances based on the product identifier 115. The product information about other similar appliances may identify alternative appliances and/or alternative vendors for the appliance.

In one embodiment, the server 102 obtains product information linked with the appliance. For example, the server 102 uses the product identifier 115 to identify product information linked with the appliance in the product information database 123. As another example, the server 102 sends a data request 126 with the product identifier 115 to request product information linked with the appliance. The product information comprises product reviews, product descriptions, warranty information, historical pricing information, seasonal pricing information, secondary costs (e.g. insurance costs and maintenance costs), demographic information about other people who purchased the appliance, and/or any other information linked with the appliance.

The server 102 generates virtual assessment data 111 that comprises account information for the user 106, one or more available new accounts for the user 106, and/or any other information. For example, the server 102 generates virtual assessment data 111 that comprises the account information and one or more available new accounts for the user 106. In this example, the virtual assessment data 111 identifies different existing accounts available for the user 106 and one or more available new accounts the user 106 may be interested in. As another example, the server 102 generates virtual assessment data 111 that comprises account information for the user 106 and product information for the appliance. In this example, the virtual assessment data 111 identifies different accounts available for the user 106 and provides information related to the appliance. As another example, the server 102 generates virtual assessment data 111 that comprises account information and identifies alternative products from other vendors. In this example, the virtual assessment data 111 identifies different accounts available for the user 106 and provides information to the user 106 about other similar products the user's 106 might want to consider. In other examples, the server 102 generates virtual assessment data 111 comprising any other information and/or combination of information. The server 102 then sends the virtual assessment data 111 to the augmented reality user device 400.

The augmented reality user device 400 receives the virtual assessment data 111 and processes the virtual assessment data 111 to access the information provided by the server 102. In one embodiment, the augmented reality user device 400 presents account information and new available accounts for the user 106 as virtual objects overlaid with tangible objects in a real scene in front of the user 106 in real time. In other embodiments, the augmented reality user device 400 presents recommendations, account information, product information, available offers for the user 106, and/or any other information as virtual objects overlaid with tangible objects in the real scene.

The augmented reality user device 400 determines whether there are any new accounts available for the user 106. In one embodiment, the augmented reality user device 400 determines there are new accounts available for the user 106 based on the presence of information linked with new accounts in the virtual assessment data 111. The augmented reality user device 400 presents the new accounts available to the user 106 as a virtual object overlaid with tangible objects in the real scene in front of the user 106. When the augmented reality user device 400 presents the one or more available new accounts, the augmented reality user device 400 determines whether the user 106 selects a new account to activate. The augmented realty user device 400 receives the indication of the selected new account from the user 106 as a voice command, a gesture, an interaction with a button on the augmented reality user device 400, or in any other suitable form. The augmented reality user device 400 is configured to send an activation command 128 identifying the selected new account to the remote server 102. The augmented reality user device 400 allows the user 106 to quickly identify any new accounts the user 106 is prequalified for based on their personal information without the user 106 having to manually search for and apply for different accounts. The augmented reality user device 400 also provides the ability activate one of the new accounts using previously stored account information and without the user 106 having to provide all of their personal information for each account they would like to activate.

The server 102 receives the activation command 128 identifying the selected new account and facilitates activating the selected new account for the user 106. For example, the server 102 exchanges messages with a third-party database 118 to activate the selected new account for the user 106. The server 102 uses account information for the user 106 or any other to activate the new account. For instance, the server 102 uses credit information and personal information for the user 106 to activate the new account. In one embodiment, the server 102 sends virtual assessment data 111 to the augmented reality user device 400 that indicates the selected new account has been activated. The activation notification may be presented to the user 106 by the augmented reality user device 400 as a virtual object.

FIG. 3 is another embodiment of a first person view from a display 408 of an augmented reality user device 400 overlaying virtual objects 202 with a real scene 200. In FIG. 3, the user 106 is shopping in a store using the augmented reality user device 400. The user 106 is looking an appliance 310. The user 106 employs the augmented reality user device 400 to determine the price of the appliance 310, to identify one or more available new accounts for the user 106, to receive account information for the user 106, to receive product information based on the appliance 310, and/or to receive any other information based on the user 106, the location of the user 106, or the appliance 310.

The user 106 uses the augmented reality user device 400 to determine the price of the appliance 310. In one embodiment, the augmented reality user device 400 queries a third-party database 118 using descriptors for the appliance 310 to determine the price of the appliance 310. In one embodiment, the augmented reality user device 400 presents the determined price of the objects 150 as a virtual object 202 in the real scene 200 using the display 408 of the augmented reality user device 400.

Additionally, the user 106 uses the augmented reality user device 400 to obtain account information for the user 106 and to determine whether there are any available new accounts for the user 106. In one embodiment, the augmented reality user device 400 generates a token 110 comprising a user identifier 108 for the user 106, a product identifier 115 for the appliance 310, and a vendor identifier 117 identifying the location where the user 106 is shopping. The augmented reality user device 400 sends the token 110 to the remote server 102 to request account information for the user 106 and to identify any available new accounts for the user 106. The account information for the user 106 and available new accounts for the user 106 may be determined based on information from multiple sources. For example, account information for the user 106 is stored in the sever 102 and information about available new accounts is stored in one or more third-party databases 118. In other examples, account information and information about available new accounts may be located in any other sources and/or combinations of sources. Tokens 110 allow the augmented reality user device 400 to request information regardless of the number of sources used to compile the requested information. Using a reduced number of requests improves the efficiency of the system compared to other systems that make individual requests to each source. Additionally, the augmented reality user device 400 is able to request information without knowledge of which sources or how many sources need to be queried for the information.

In response to sending the token 110, the augmented reality user device 400 received virtual assessment data 111 from the remote server 102. In one embodiment, the virtual assessment data 111 comprises account information, available new accounts, and a recommendation for the user 106. The augmented reality user device 400 presents the user's 106 account information as a virtual object 302 overlaid with the real scene 200 in front of the user 106. In this example, the virtual object 302 presents two accounts for the user 106. The augmented reality user device 400 presents the available new accounts as another virtual object 304 overlaid with the real scene 200 in front of the user 106. In this example, the user's 106 existing accounts and available new accounts are each shown as lists. However, in other examples the user's 106 existing accounts and available new accounts may be presented in any other suitable form.

The augmented reality user device 400 presents the recommendation for the user 106 as another virtual object 306 overlaid with the real scene 200 in front of the user 106. In FIG. 3, the recommendation identifies a vendor to purchase the appliance 310 from and one of the user's 106 accounts to make the purchase. The recommendation may comprise any other information or combination of information for the user 106.

The augmented reality user device 400 presents alternative vendors of the appliance 310 for the user 106 as a virtual object 308. In this example, three different vendors and their prices for the appliance 310 are presented to the user 106. In other examples, any number vendors may be presented to the user 106. In other examples, the augmented reality user device 400 presents any other information linked with the user 106, the appliance 310, and/or the vendor.

FIG. 4 is a schematic diagram of an embodiment of an augmented reality user device 400 employed by an augmented reality system 100. The augmented reality user device 400 is configured to capture an image 407 of an object (e.g. a product, a sign, or a business), to send a token 110 identifying a user 106 and the object to a remote server 102, to receive virtual assessment data 111 in response to sending the token 110, and to present virtual objects overlaid onto one or more tangible objects in a real scene based on the information provided by the virtual assessment data 111. Examples of the augmented reality user device 400 in operation is described in FIGS. 5, 7, and 10.

The augmented reality user device 400 comprises a processor 402, a memory 404, a camera 406, a display 408, a wireless communication interface 410, a network interface 412, a microphone 414, a GPS sensor 416, and one or more biometric devices 418. The augmented reality user device 400 may be configured as shown or in any other suitable configuration. For example, augmented reality user device 400 may comprise one or more additional components and/or one or more shown components may be omitted.

Examples of the camera 406 include, but are not limited to, charge-coupled device (CCD) cameras and complementary metal-oxide semiconductor (CMOS) cameras. The camera 406 is configured to capture images 407 of people, text, and objects within a real environment. The camera 406 is configured to capture images 407 continuously, at predetermined intervals, or on-demand. For example, the camera 406 is configured to receive a command from a user to capture an image 407. In another example, the camera 406 is configured to continuously capture images 407 to form a video stream of images 407. The camera 406 is operable coupled to an object recognition engine 424, an optical character (OCR) recognition engine 426, and/or a gesture recognition engine 428 and provides images 407 to the object recognition engine 424, the OCR recognition engine 426, and/or the gesture recognition engine 428 for processing, for example, to identify gestures, text, and/or objects in front of the user.

The display 408 is configured to present visual information to a user in an augmented reality environment that overlays virtual or graphical objects onto tangible objects in a real scene in real-time. In an embodiment, the display 408 is a wearable optical head-mounted display configured to reflect projected images and allows a user to see through the display 408. For example, the display 408 may comprise display units, lens, semi-transparent mirrors embedded in an eye glass structure, a contact lens structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matric OLED (AMOLED), an organic LED (OLED) display, a projector display, or any other suitable type of display as would be appreciated by one of ordinary skill in the art upon viewing this disclosure. In another embodiment, the display 408 is a graphical display on a user device. For example, the graphical display may be the display of a tablet or smart phone configured to display an augmented reality environment with virtual or graphical objects overlaid onto tangible objects in a real scene in real-time.

Examples of the wireless communication interface 410 include, but are not limited to, a Bluetooth interface, a radio frequency identifier (RFID) interface, a near-field communication (NFC) interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. The wireless communication interface 410 is configured to allow the processor 402 to communicate with other devices. For example, the wireless communication interface 410 is configured to allow the processor 402 to send and receive signals with other devices for the user (e.g. a mobile phone) and/or with devices for other people. The wireless communication interface 410 is configured to employ any suitable communication protocol.

The network interface 412 is configured to enable wired and/or wireless communications and to communicate data through a network, system, and/or domain. For example, the network interface 412 is configured for communication with a modem, a switch, a router, a bridge, a server, or a client. The processor 402 is configured to receive data using network interface 412 from a network or a remote source.

Microphone 414 is configured to capture audio signals (e.g. voice commands) from a user and/or other people near the user. The microphone 414 is configured to capture audio signals continuously, at predetermined intervals, or on-demand. The microphone 414 is operably coupled to the voice recognition engine 422 and provides captured audio signals to the voice recognition engine 422 for processing, for example, to identify a voice command from the user.

The GPS sensor 416 is configured to capture and to provide geographical location information. For example, the GPS sensor 416 is configured to provide the geographic location of a user employing the augmented reality user device 400. The GPS sensor 416 is configured to provide the geographic location information as a relative geographic location or an absolute geographic location. The GPS sensor 416 provides the geographic location information using geographic coordinates (i.e. longitude and latitude) or any other suitable coordinate system.

Examples of biometric devices 418 include, but are not limited to, retina scanners and finger print scanners. Biometric devices 418 are configured to capture information about a person's physical characteristics and to output a biometric signal 431 based on captured information. A biometric signal 431 is a signal that is uniquely linked to a person based on their physical characteristics. For example, a biometric device 418 may be configured to perform a retinal scan of the user's eye and to generate a biometric signal 431 for the user based on the retinal scan. As another example, a biometric device 418 is configured to perform a fingerprint scan of the user's finger and to generate a biometric signal 431 for the user based on the fingerprint scan. The biometric signal 431 is used by a biometric engine 432 to identify and/or authenticate a person. In one embodiment, the biometric device 418 are configured to collect health information (e.g. vitals) for a user as biometric signals 431. Examples of health information includes, but is not limited to, heart rate, blood sugar, eye dilation, and perspiration levels.

The processor 402 is implemented as one or more CPU chips, logic units, cores (e.g. a multi-core processor), FPGAs, ASICs, or DSPs. The processor 402 is communicatively coupled to and in signal communication with the memory 404, the camera 406, the display 408, the wireless communication interface 410, the network interface 412, the microphone 414, the GPS sensor 416, and the biometric devices 418. The processor 402 is configured to receive and transmit electrical signals among one or more of the memory 404, the camera 406, the display 408, the wireless communication interface 410, the network interface 412, the microphone 414, the GPS sensor 416, and the biometric devices 418. The electrical signals are used to send and receive data (e.g. images 407 and tokens 110) and/or to control or communicate with other devices. For example, the processor 402 transmit electrical signals to operate the camera 406. The processor 402 may be operably coupled to one or more other devices (not shown).

The processor 402 is configured to process data and may be implemented in hardware or software. The processor 402 is configured to implement various instructions. For example, the processor 402 is configured to implement a virtual overlay engine 420, a voice recognition engine 422, an object recognition engine 424, an OCR recognition engine 426, a gesture recognition engine 428, a virtual assessment engine 430, and a biometric engine 432. In an embodiment, the virtual overlay engine 420, the voice recognition engine 422, the object recognition engine 424, the OCR recognition engine 426, the gesture recognition engine 428, the virtual assessment engine 430, and the biometric engine 432 are implemented using logic units, FPGAs, ASICs, DSPs, or any other suitable hardware.

The virtual overlay engine 420 is configured to overlay virtual objects onto tangible objects in a real scene using the display 408. For example, the display 408 may be head-mounted display that allows a user to simultaneously view tangible objects in a real scene and virtual objects. The virtual overlay engine 420 is configured to process data to be presented to a user as an augmented reality virtual object on the display 408. Examples of overlaying virtual objects onto tangible objects in a real scene is shown in FIGS. 2, 3, and 9.

The voice recognition engine 422 is configured to capture and/or identify voice patterns using the microphone 414. For example, the voice recognition engine 422 is configured to capture a voice signal from a person and to compare the captured voice signal to known voice patterns or commands to identify the person and/or commands provided by the person. For instance, the voice recognition engine 422 is configured to receive a voice signal to authenticate a user and/or to identify a selected option or an action indicated by the user.

The object recognition engine 424 is configured to identify objects, object features, branding, text, and/or logos using images 407 or video streams created from a series of images 407. In one embodiment, the object recognition engine 424 is configured to identify objects and/or text within an image 407 captured by the camera 406. In another embodiment, the object recognition engine 424 is configured to identify objects and/or text in about real-time on a video stream captured by the camera 406 when the camera 406 is configured to continuously capture images 407. The object recognition engine 424 employs any suitable technique for implementing object and/or text recognition as would be appreciated by one of ordinary skill in the art upon viewing this disclosure.

The OCR recognition engine 426 is configured to identify objects, object features, text, and/or logos using images 407 or video streams created from a series of images 407. In one embodiment, the OCR recognition engine 426 is configured to identify objects and/or text within an image 407 captured by the camera 306. In another embodiment, the OCR recognition engine 426 is configured to identify objects and/or text in about real-time on a video stream captured by the camera 406 when the camera 406 is configured to continuously capture images 407. The OCR recognition engine 426 employs any suitable technique for implementing object and/or text recognition as would be appreciated by one of ordinary skill in the art upon viewing this disclosure.

The gesture recognition engine 428 is configured to identify gestures performed by a user and/or other people. Examples of gestures include, but are not limited to, hand movements, hand positions, finger movements, head movements, and/or any other actions that provide a visual signal from a person. For example, gesture recognition engine 428 is configured to identify hand gestures provided by a user to indicate various commands such as a command to initiate a request for an augmented reality overlay for an object. The gesture recognition engine 428 employs any suitable technique for implementing gesture recognition as would be appreciated by one of ordinary skill in the art upon viewing this disclosure.

The virtual assessment engine 430 is configured to identify the location of the user 106 and to generate a vendor identifier 117 or a location identifier 902 based on the location of the user 106. In one embodiment, the augmented reality user device 400 identifies the location of the user 106 based on the geographic location of the user 106. For example, the augmented reality user device 400 uses geographic location information provided by the GPS sensor 416 with a map database (e.g. a third-party database 118) to determine the location of the user 106. In another embodiment, the augmented reality user device 400 is configured to use object recognition and/or optical character recognition to identify the location of the user 106. For example, the augmented reality user device 400 is configured to identify the location of the user 106 based on identifying buildings, structures, landmarks, branding, signs, logo, and/or any other types of objects around the user 106. In other embodiments, the augmented reality user device 400 determines the location of the user 106 based on any other information or using any other suitable technique as would be appreciated by one of ordinary skill in the art.

The virtual assessment engine 430 is configured to identify tangible objects 150 in front of the user 106 and to generate product identifiers 115 for the objects 150. The virtual assessment engine 430 is configured to use object recognition and/or optical character recognition to identify an object 150. In one embodiment, the virtual assessment engine 430 is configured to capture an image 407 of an object 150 and to perform object recognition and/or optical character recognition on the image 407 of the object 150 to identify the object 150. The virtual assessment engine 430 is configured to identify the object 150 based on the size, shape, features, and/or any other characteristics of the object 150. For example, the virtual assessment engine 430 identifies the object 150 based on branding, text, or logos on the object 150 or its packaging. The virtual assessment engine 430 identifies the object 150 based on any other characteristics of the object 150 or using any other suitable technique as would be appreciated by one of ordinary skill in the art.

The virtual assessment engine 430 is further configured to determine a price for one or more objects 150. In one embodiment, the virtual assessment engine 430 is configured to access a third-party database 118 to determine the price for each of the objects 150. For example, the virtual assessment engine 430 queries a third-party database 118 linked with a vendor of the one or more objects 150 to determine the price of the one or more objects 150. In one embodiment, the virtual assessment engine 430 sends a message 113 with descriptors for the one or more objects 150 to the third-party database 118.

In another embodiment, the virtual assessment engine 430 determines the price of the objects 150 using barcodes, QR codes, digital watermarks, or price tags associated with the objects 150. For example, the virtual assessment engine 430 identifies price tags on the objects 150 and determines the price of the objects 150 based on the price tags. As another example, the virtual assessment engine 430 identifies price tags on the shelves when the user 106 picks up an object 150. In another embodiment, the virtual assessment engine 430 determines the total price of the objects 150 based on an input provided by the user 106. The virtual assessment engine 430 is configured to determine prices of the objects 150 based on a voice command, a gesture, an interaction with a button on the augmented reality user device 400, or in any form of user input. For example, the virtual assessment engine 430 is configured to receive voice commands from the user 106 stating the prices of each of the objects 150. In other examples, the virtual assessment engine 430 is configured to determine the price of the objects 150 using any other suitable technique as would be appreciated by one of ordinary skill in the art.

The virtual assessment engine 430 is configured to collect user history data for a user 106. Examples of user history data include, but are not limited to, location history, internet search history, transaction history, biometric signal history, and/or any other kind of history for the user 106. In one embodiment, the virtual assessment engine 430 is configured to collect user history data from one or more other devices such as a mobile device of the user or a third-party database 118. In other embodiments, the virtual assessment engine 430 is configured to collect user history data from any suitable sources.

The virtual assessment engine 430 is configured to generate a token 110 for requesting information for the user 106. In one embodiment, the token 110 comprises a user identifier 108, a vendor identifier 117, one or more product identifiers 115, and a price 109. In other embodiments, the token 110 identifies any other information or combination of information. The virtual assessment engine 430 is further configured to encrypt and/or encode the token 110. Encrypting and encoding the token 110 obfuscates and mask information being communicated by the token 110. Masking the information being communicated protects users and their information in the event of unauthorized access to the network and/or data occurs. The virtual assessment engine 430 employs any suitable encryption or encoding technique as would be appreciated by one of ordinary skill in the art.

The virtual assessment engine 430 is configured to send the token 110 to a remote server 102 as a data request to initiate the process of obtaining information for the user 106. The virtual assessment engine 430 is further configured to provide the information (e.g. virtual overlay data 111) received from the remote server 102 to the virtual overlay engine 420 to present the information as one or more virtual objects overlaid with tangible objects in a real scene. Examples of employing the virtual assessment engine 430 to request information and present the information to a user 106 is described in FIGS. 5, 7, and 10.

The virtual assessment engine 430 is further configured to employ the virtual overlay engine 420 to present one or more offers or new accounts that are available for the user 106, geolocation notifications 908, and/or any other information. In one embodiment, the virtual assessment engine 430 is configured to identify selected offers and new accounts by the user 106. For example, the virtual assessment engine 430 is configured to identify a selected offer and to send an activation command 128 to the remote server 102 that identifies the selected offer to activate. As another example, the virtual assessment engine 430 is configured to identify a selected new account for the user 106 and to send an activation command 128 to the remote server 102 that identifies the selected new account to activate. The user 106 may identify a selection by giving a voice command, performing a gesture, interacting with a physical component (e.g. a button, knob, or slider) of the augmented reality user device 400, or any other suitable mechanism as would be appreciated by one of ordinary skill in the art. An example of employing the virtual assessment engine 430 to identify a selected offer and to send an activation command 128 to the remote server 102 that identifies the selected offer is described in FIG. 5. An example of employing the virtual assessment engine 430 to identify a selected new account and to send an activation command 128 to the remote server 102 that identifies the selected offer is described in FIG. 7.

The biometric engine 432 is configured to identify a person based on a biometric signal 431 generated from the person's physical characteristics. The biometric engine 432 employs one or more biometric devices 418 to identify a user 106 based on one or more biometric signals 418. For example, the biometric engine 432 receives a biometric signal 431 from the biometric device 418 in response to a retinal scan of the user's eye and/or a fingerprint scan of the user's finger. The biometric engine 432 compares biometric signals 431 from the biometric device 418 to previously stored biometric signals 431 for the user 106 to authenticate the user 106. The biometric engine 432 authenticates the user 106 when the biometric signals 431 from the biometric devices 418 substantially matches (e.g. is the same as) the previously stored biometric signals 431 for the user 106. In one embodiment, the biometric engine 432 is configured to employ biometric device 418 to collect health information (e.g. vitals) for a user 106.

The memory 404 comprise one or more disks, tape drives, or solid-state drives, and may be used as an over-flow data storage device, to store programs when such programs are selected for execution, and to store instructions and data that are read during program execution. The memory 404 may be volatile or non-volatile and may comprise ROM, RAM, TCAM, DRAM, and SRAM. The memory 404 is operable to store images 407, tokens 110, biometric signals 431, virtual overlay instructions 434, voice recognition instructions 436, OCR recognition instructions 438, object recognition instructions 440, gesture recognition instructions 442, virtual assessment instructions 444, biometric instructions 446, and any other data or instructions.

Images 407 comprises images captured by the camera 406 and images 407 from other sources. In one embodiment, images 407 comprise images used by the augmented reality user device 400 when performing object recognition and/or optical character recognition. Images 407 can be captured using camera 406 or downloaded from another source such as a flash memory device or a remote server via an Internet connection.

Biometric signals 431 are signals or data that is generated by a biometric device 418 based on a person's physical characteristics. Biometric signals 431 are used by the augmented reality user device 400 to identify and/or authenticate an augmented reality user device 400 user by comparing biometric signals 431 captured by the biometric devices 418 with previously stored biometric signals 431.

Tokens 110 are generated by the virtual assessment engine 430 and sent to a remote server 102 to initiate a process for obtaining information linked with an object, a vendor, and/or a user 106. Tokens 110 comprise any suitable information for requesting information from the remote server 102 and/or one or more other sources (e.g. third-party databases 118). In one embodiment, the token 110 is a message or data request comprising information identifying a user 106 (e.g. user identifier 108), one or more objects 150 (e.g. one or more product identifiers 115), and the location of the user 106 (e.g. a vendor identifier 117 or a location identifier 902). In other embodiments, the token 110 comprises any other information or combinations of information. Examples of the augmented reality user device 400 generating and sending a token 110 to initiate a process for obtaining information is described in FIGS. 5, 7, and 10.

The virtual overlay instructions 434, the voice recognition instructions 436, the OCR recognition instructions 438, the object recognition engine 440, the gesture recognition instructions 442, the virtual assessment instructions 444, and the biometric instructions 446 each comprise any suitable set of instructions, logic, rules, or code operable to execute the virtual overlay engine 420, the voice recognition engine 422, the OCR recognition engine 426, the object recognition engine 424, the gesture recognition engine 428, the virtual assessment engine 430, and the biometric engine 432, respectively.

FIG. 5 is a flowchart of an embodiment of an augmented reality overlaying method 500 for an augmented reality system 100. In one embodiment, the augmented reality system 100 is configured similar to the augmented reality system 100 described in FIG. 1. Method 500 is employed by the processor 402 of the augmented reality user device 400 to generate a token 110 based on a user 106 of the augmented reality user device 400, the location of the user 106, and one or more products. The augmented reality user device 400 uses the token 110 to request account information for the user 106 and/or to determine whether there are any offers available for the user 106. The augmented reality user device 400 receives the requested information in response to sending the token 110 and presents received information as virtual objects overlaid with tangible object in a real scene in front of the user 106.

At step 502, the augmented reality user device 400 authenticates a user 106. The user 106 authenticates themselves by providing credentials (e.g. a log-in and password) or a biometric signal. The augmented reality user device 400 authenticates the user 106 based on the user's input. The user 106 is able to generate and send tokens 110 using the augmented reality user device 400 upon authenticating the user 106.

At step 504, the augmented reality user device 400 identifies a user identifier 108 for the user 106. Once the user 106 has been authenticated, the augmented reality user device 400 identifies the user 106 and a user identifier 108 for the user 106. The user identifier 108 may be used to identify and authenticate the user 106 in other systems, for example, third-party databases 118.

At step 506, the augmented reality user device 400 identifies a vendor based on the geographic location of the user 106. In one embodiment, the augmented reality user device 400 uses geographic location information provided by the GPS sensor 416 with a map database to determine the location of the user 106 and to identify the vender where the user 106 is shopping. In another embodiment, the augmented reality user device 400 uses object recognition and/or optical character recognition to identify the vendor based on structures, branding, signs, and/or logos.

At step 508, the augmented reality user device 400 captures an image 407 of products in a cart. In one embodiment, the user 106 provides a command or signal to the augmented reality user device 400 that triggers the camera 406 to capture an image 407 of the products in the cart. In another embodiment, the augmented reality user device 400 and the camera 406 are configured to continuously or periodically capture images 407.

At step 510, the augmented reality user device 400 performs object recognition on the image 407 to identify the products in the cart. For example, the augmented reality user device 400 identifies the products based on the size and shape of the products and/or based on branding, text, or logos on their packaging. In other examples, the augmented reality user device 400 identifies the products based on any other features of the products and/or using any other suitable technique.

At step 512, the augmented reality user device 400 determines a price for the products in the cart. In one embodiment, the augmented reality user device 400 queries a third-party database 118 using descriptors for the identified products. In another embodiment, the augmented reality user device 400 determines the price for the products by identifying barcodes, QR codes, digital watermarks, and/or price tags for the products. In some embodiments, step 512 is optional and may be omitted.

At step 514, the augmented reality user device 400 generates a token 110. In one embodiment, the token 110 comprises the user identifier 108, product identifiers 115 linked with the products, and a vendor identifier 117 linked with the vendor. In other embodiments, the token 110 comprises the price of the products and/or any other information. At step 516, the augmented reality user device 400 sends the token 110 to a remote server 102.

At step 518, the augmented reality user device 400 receives virtual assessment data 111 in response to sending the token 110 to the server 102. The virtual assessment data 111 comprises account information, recommendations, budget information, one or more offers available to the user 106, any other information, and/or combinations of information.

At step 520, the augmented reality user device 400 presents a recommendation for the user 106 as a virtual object overlaid with the products in the real scene in front of the user 106. The augmented reality user device 400 presents a recommendation and any other information provided by the virtual assessment data 111 as virtual objects overlaid on top of the products or adjacent to the products. When the augmented reality user device 400 presents the virtual objects to the user 106, the user 106 can readily see their current account information.

At step 522, the augmented reality user device 400 determines whether there are any offers available for the user 106. For example, the augmented reality user device 400 determines that there are offers available to the user 106 based on the presence of the offers in the virtual assessment data 111. In other examples, the augmented reality user device 400 employs any other technique for determining whether there are offers available to the user 106. The augmented reality user device 400 proceeds to step 524 when the augmented reality user device 400 determines that there are offers available for the user 106. The augmented reality user device 400 may terminate method 500 when the augmented reality user device 400 determines there are no offers available for the user 106.

At step 524, the augmented reality user device 400 presents the offers available for the user 106 as a virtual object in the real scene in front of the user 106. The augmented reality user device 400 presents the offers available for the user 106 as virtual objects overlaid on top of the products or adjacent to the products. When the augmented reality user device 400 presents the virtual objects to the user 106, the user 106 can quickly identify any offer that are available to the user 106.

At step 526, the augmented reality user device 400 determines whether the user 106 accepts any of the offers. The augmented reality user device 400 determines that the user 106 accepts an offer when the augmented reality user device 400 receives an indication of a selected offer from the user 106 as a voice command, a gesture, an interaction with a button on the augmented reality user device, or in any other suitable form. The augmented reality user device 400 proceeds to step 528 when the augmented reality user device 400 determines that the user 106 accepts one of the offers available for the user 106. The augmented reality user device 400 may terminate method 500 when the augmented reality user device 400 determines that the user 106 does not accept any of the offers available for the user 106.

At step 528, the augmented reality user device 400 identifies the selected offer from the user 106 based on the indication provided by the user 106. At step 530, the augmented reality user device 400 sends an activation command 128 identifying the selected offer to the remote server 102.

FIG. 6 is a flowchart of another embodiment of an augmented reality overlaying method 600 for an augmented reality system 100. In one embodiment, the augmented reality system 100 is configured similar to the augmented reality system 100 described in FIG. 1. Method 600 is employed by the product analysis engine 116 in the server 102 to identify account information and/or offers available for a user 106 of an augmented reality user device 400 and provides the requested information to the user 106 in response to receiving a token 110 from the augmented reality user device 400.

At step 602, the product analysis engine 116 receives a token 110 from the augmented reality user device 400. The product analysis engine 116 decrypts and/or decodes the token 110 when the token 110 is encrypted or encoded by the augmented reality user device 400. In one embodiment, the product analysis engine 116 processes the token 110 to identify a user identifier 108, one or more product identifiers 115, and a vendor identifier 117. In other embodiments, the product analysis engine 116 processes the token 110 to identify a price for one or more products linked with the product identifiers 115 and/or any other information.

At step 604, the product analysis engine 116 determines account information for a user 106 based on the user identifier 108. For example, the product analysis engine 116 uses the user identifier 108 to look-up the account information and accounts for the user 106 in the account information database 120.

At step 606, the product analysis engine 116 determines whether there are any offers available based on the product identifiers 115, the vendor identifier 117, and the account information for the user 106. For example, the product analysis engine 116 queries the offers database 122 for any available offers using the user identifier 108, the account information for the user 106, the product identifiers 115, and/or the vendor identifier 117. As another example, the product analysis engine 116 sends a data request 126 to one or more third-party databases 118 to query the third-party databases 118 for available offers for the user 106 based on the user identifier 108, the account information for the user 106, the product identifiers 115, and/or the vendor identifier 117.

At step 608, the product analysis engine 116 proceeds to step 610 when the product analysis engine 116 determines there are no offers available for the user 106. Otherwise, the product analysis engine 116 proceeds to step 612 when the product analysis engine 116 determines there are offers available for the user 106.

At step 610, the product analysis engine 116 generates a recommendation based on the account information for the user 106. For example, the product analysis engine 116 generates a recommendation that identifies one of the user's 106 accounts for a transaction to purchase the products. In this example, the product analysis engine 116 may select one of the user's 106 accounts that does not cause the user 106 to go over budget or to overdraft. In other examples, the product analysis engine 116 generates any other type of recommendation based on any other criteria. At step 614, the product analysis engine 116 generates virtual assessment data 111 comprising the recommendation and account information for the user 106. The account information comprises one or more accounts for the user 106, budget information for the user 106, and/or any other account information for the user 106.

Returning to step 608, the product analysis engine 116 proceeds to step 612 when the product analysis engine 116 determines there are offers available. At step 612, the product analysis engine 116 generates a recommendation based on the account information for the user 106 and the available offers for the user 106. At step 616, the product analysis engine 116 generates virtual assessment data 111 comprising the recommendation, account information for the user 106, and the available offers for the user 106. For example, the product analysis engine 116 generates a recommendation that identifies one or more offers (e.g. coupons) that can applied to a transaction to purchase the products identified by the product identifiers 115. At step 618, the product analysis engine 116 sends the virtual assessment data 111 to the augmented reality user device 400.

At step 620, the product analysis engine 116 determines whether the product analysis engine 116 has received an activation command 128 from the augmented reality user device 400. The product analysis engine 116 proceeds to step 622 when the product analysis engine 116 receives an activation command 128 from the augmented reality user device 400. Otherwise, the product analysis engine 116 terminates method 600 when the product analysis engine 116 does not receive an activation command 128 from the augmented reality user device 400.

At step 622, the product analysis engine 116 activates an offer selected by the user 106. The received activation command 128 identifies a selected offer for the user 106. The product analysis engine 116 facilitates activating the selected offer. For example, the product analysis engine 116 exchanges messages with a third-party database 118 to activate the selected offer. As another example, the product analysis engine 116 notifies the offers database 122 to activate the selected offer. The product analysis engine 116 may employ any other suitable technique for activating the selected offer.

FIG. 7 is a flowchart of another embodiment of an augmented reality overlaying method 700 for an augmented reality system 100. In one embodiment, the augmented reality system 100 is configured similar to the augmented reality system 100 described in FIG. 1. Method 700 is employed by the processor 402 of the augmented reality user device 400 to generate a token 110 based on a user 106 of the augmented reality user device 400, the location of the user 106, and a product. In one embodiment, the product is a product with a medium to high price, for example, televisions, golf clubs, washers, dryers, appliances, vehicles, and computers. The augmented reality user device 400 uses the token 110 to request account information for the user 106 and/or to determine whether there are any new accounts available for the user 106. The augmented reality user device 400 receives the requested information in response to sending the token 110 and presents the received information as virtual objects overlaid with tangible object in a real scene in front of the user 106.

At step 702, the augmented reality user device 400 authenticates a user 106. The user 106 authenticates themselves by providing credentials (e.g. a log-in and password) or a biometric signal. The augmented reality user device 400 authenticates the user 106 based on the user's input. The user 106 is able to generate and send tokens 110 using the augmented reality user device 400 upon authenticating the user 106.

At step 704, the augmented reality user device 400 identifies a user identifier 108 for the user 106. Once the user 106 has been authenticated, the augmented reality user device 400 identifies the user 106 and a user identifier 108 for the user 106. The user identifier 108 may be used to identify and authenticate the user 106 in other systems.

At step 706, the augmented reality user device 400 identifies a vendor based on the geographic location of the user 106. In one embodiment, the augmented reality user device 400 uses geographic location information provided by the GPS sensor 416 and map database to determine the location of the user 106 and to identify the vender where the user 106 is shopping. In another embodiment, the augmented reality user device 400 uses object recognition and/or optical character recognition to identify the vendor based on structures, branding, signs, and/or logos.

At step 708, the augmented reality user device 400 captures an image 407 of a product. In one embodiment, the user 106 provides a command or signal to the augmented reality user device 400 that triggers the camera 406 to capture an image 407 of the product. In another embodiment, the augmented reality user device 400 and the camera 406 are configured to continuously or periodically capture images 407.

At step 710, the augmented reality user device 400 performs object recognition on the image 407 to identify the product. For example, the augmented reality user device 400 identifies the product based on the size and shape of the product and/or based on text or logos on its packaging. In other examples, the augmented reality user device 400 identifies the product based on any other features of the product and/or using any other suitable technique.

At step 712, the augmented reality user device 400 determines a price of the product. In one embodiment, the augmented reality user device 400 queries a third-party database 118 using descriptors for the identified product. In another embodiment, the augmented reality user device 400 determines the price for the product by identifying a barcode, QR codes, digital watermarks, and/or price tag for the product. In some embodiments, step 712 is optional and may be omitted.

At step 714, the augmented reality user device 400 generates a token 110. In one embodiment, the token 110 comprises the user identifier 108, a product identifier 115 linked with the product, and a vendor identifier 117. In other embodiments, the token 110 comprises the price of the product and/or any other information. At step 716, the augmented reality user device 400 sends the token 110 to a remote server 102.

At step 718, the augmented reality user device 400 receives virtual assessment data 111. The virtual assessment data 111 comprises account information, recommendations, one or more new accounts available for the user 106, any other information, and/or combination of information.

At step 720, the augmented reality user device 400 presents a recommendation for the user 106 as a virtual object in the real scene in front of the user 106. The augmented reality user device 400 presents a recommendation and any other information provided by the virtual assessment data 111 as virtual objects overlaid on top of the products or adjacent to the products. When the augmented reality user device 400 presents the virtual objects to the user 106, the user 106 can readily see their current account information.

At step 722, the augmented reality user device 400 determined whether there any new accounts available for the user 106. For example, the augmented reality user device 400 determines that there are new accounts available for the user 106 based on the presence of new accounts in the virtual assessment data 111. In other examples, the augmented reality user device 400 employs any other technique for determining whether there are new accounts available for the user 106. The augmented reality user device 400 proceeds to step 724 when the augmented reality user device 400 determines there are new accounts available for the user 106. The augmented reality user device 400 terminates the method 700 when the augmented reality user device 400 determines there are no new accounts available for the user 106.

At step 724, the augmented reality user device 400 presents the available new accounts to the user 106 as virtual objects in the real scene. The augmented reality user device 400 presents the new accounts available for the user 106 as virtual objects overlaid on top of the product or adjacent to the product. When the augmented reality user device 400 presents the virtual objects to the user 106, the user 106 can quickly identify any new accounts that are available for the user 106 based on their account information, the vendor where they are shopping, and the product. For example, the augmented reality user device 400 presents a new credit card account that the user 106 is prequalified for. As another example, the augmented reality user device 400 is configured to present a new loan or line of credit that the user 106 is prequalified for. As another example, the augmented reality user device 400 presents a loyalty or rewards account for a vendor that the user 106 is qualified to join and is not already a member of. In other examples, the augmented reality user device 400 presents any other kind of new accounts the user 106 is qualified for.

At step 726, the augmented reality user device 400 determines whether the user 106 accepts any of the new accounts available for the user 106. The augmented reality user device 400 determines that the user 106 accepts one of the new accounts when the augmented reality user device 400 receives an indication of a selected new account from the user 106 as a voice command, a gesture, an interaction with a button on the augmented reality user device, or in any other suitable form. The augmented reality user device 400 may terminate method 700 when the augmented reality user device 400 determines that the user 106 does not accept any of the new accounts available for the user 106.

At step 728, the augmented reality user device 400 identifies the selected new account from the user 106. At step 730, the augmented reality user device 400 sends an activation command 128 identifying the selected new account to the remote server 102.

FIG. 8 is a flowchart of another embodiment of an augmented reality overlaying method 800 for an augmented reality system 100. In one embodiment, the augmented reality system 100 is configured similar to the augmented reality system 100 described in FIG. 1. Method 800 is employed by the product analysis engine 116 in the server 102 to identify account information and/or new accounts available for the user 106 of an augmented reality user device 400 and provides the requested information to the user 106 in response to receiving a token 110 from the augmented reality user device 400.

At step 802, the product analysis engine 116 receives a token 110 from an augmented reality user device 400. The product analysis engine 116 decrypts and/or decodes the token 110 when the token 110 is encrypted or encoded by the augmented reality user device 400. In one embodiment, the product analysis engine 116 processes the token 110 to identify the user identifier 108, the product identifier 115, the vendor identifier 117, and the price. In other embodiments, the product analysis engine 116 processes the token 110 to identify any other information.

At step 804, the product analysis engine 116 determines account information for the user 106 based on the user identifier 108. For example, the product analysis engine 116 uses the user identifier 108 to look-up the account information for the user 106 in the account information database 120.

At step 806, the product analysis engine 116 identifies one or more accounts for the user 106 based on the account information. For example, the product analysis engine 116 queries the account information database 120 for existing accounts for the user 106 using the user identifier 108.

At step 808, the product analysis engine 116 determines whether there are new accounts available for the user 106 based on the account information. In one embodiment, the product analysis engine 116 queries the account information database 120 for any available new accounts for the user 106 using the user identifier 108, account information for the user 106, the product identifiers 115, and/or the vendor identifier 117. In another embodiment, the product analysis engine 116 sends a data request 126 to one or more third-party databases 118 to query the third-party databases 118 for available new accounts for the user 106 based on the user identifier 108, the account information for the user 106, the product identifiers 115, and/or the vendor identifier 117.

In one embodiment, the product analysis engine 116 prequalifies the user 106 for a new account based on the user's 106 account information. For instance, the product analysis engine 116 uses a credit history or a credit score for the user 106 to identify new accounts for the user 106, for example, a credit card or a line of credit. As another example, the product analysis engine 116 uses the account information to identify loyalty or reward programs the user 106 is a member of. The product analysis engine 116 identifies new loyalty or reward program accounts for the user 106 that the user 106 is not already a member of. In other examples, the product analysis engine 116 identifies new accounts for the user 106 using any other suitable information for the user 106.

At step 810, the product analysis engine 116 selects an account from the one or more accounts and/or the one or more new accounts for the user 106 based on the price of the product. In one embodiment, the product analysis engine 116 selects a particular account for the user 106 based on the price of the product. For example, when the price of the product is high, the product analysis engine 116 selects an account that allows financing or payments rather than depleting one of the user's 106 accounts. In another embodiment, the product analysis engine 116 selects an account that avoids over drafting or going over budget for the user 106. In another embodiment, the product analysis engine 116 selects an account that provides some benefit (e.g. reward points) for the user 106. In other embodiments, the product analysis engine 116 selects an account for the user 106 based on any other criteria. At step 812, the product analysis engine 116 generates a recommendation identifying the selected account for the user 106.

At step 814, the product analysis engine 116 proceeds to step 816 when the product analysis engine 116 determines there are no new accounts available for the user 106. At step 816, the product analysis engine 116 generates virtual assessment data 111 comprising the recommendation for the user 106. The product analysis engine 116 proceeds to step 818 when the product analysis engine 116 determines there are new accounts available for the user 106. At step 818, the product analysis engine 116 generates virtual assessment data 111 comprising the recommendation and identifying the one or more new accounts available for the user 106. In one embodiment, the virtual assessment data 111 comprises information for the one or more available new accounts. For example, the virtual assessment data 111 comprises interest rate information, term information, monthly payment information, or any other information about the new accounts. At step 820, the product analysis engine 116 sends the virtual assessment data 111 to the augmented reality user device 400.

At step 822, the product analysis engine 116 determines whether the products analysis engine 116 has received an activation command 128 from the augmented reality user device 400. The product analysis engine 116 proceeds to step 824 when the product analysis engine 116 has received an activation command. Otherwise, the product analysis engine 116 terminates method 800.

At step 824, the product analysis engine 116 activates the new account selected by the user 106. The received activation command 128 identifies a selected new account for the user 106. The product analysis engine 116 facilitates activating the selected new account. For example, the product analysis engine 116 exchanges messages with a third-party database 118 to activate the selected new account. As another example, the product analysis engine 116 updates the offers database 122 to activate the selected new account. The product analysis engine 116 may employ any other suitable technique for activating the selected new account.

FIG. 9 is a schematic diagram of another embodiment of an augmented reality system 100 configured to overlay virtual objects with a real scene. The augmented reality system 100 is configured similar to the augmented reality system 100 described in FIG. 1. For example, the augmented reality user device 400, the network 104, the server 102, and the third-party database 118 are configured similar to augmented reality user device 400, the network 104, the server 102, and the third-party database 118 described in FIG. 1, respectively.

In FIG. 9, the augmented reality user device 400 is configured to identify one or more businesses proximate to the user 106. The augmented reality user device 400 captures an image 407 of buildings, structures, and/or businesses around the user 106. The augmented reality user device 400 performs object recognition on the captured image 407 to identify businesses proximate to the user 106. The augmented reality user device 400 identifies businesses based on structures, branding, signs, logos, and/or any other identifiers associated with the businesses.

The augmented reality user device 400 is configured to generate a token 110 that comprises a user identifier 108 for the user 106, a location identifier 902 identifying the location of the user 106, user history 940 for the user 106, and/or any other information. In one embodiment, the location identifier 902 identifies the location of the user 106 using any suitable coordinate system and/or location descriptors. Examples of location identifier 902 include, but are not limited to, a location name, a physical address, and latitude and longitude coordinates. In another embodiment, the location identifier 902 identifies the location of the user 106 based on buildings, landmarks, and/or businesses proximate to the user 106. For example, the location identifier 902 identifies one or more businesses proximate to the user 106.

User history 904 comprises user history data or information linked with the user 106. Examples of user history data include, but are not limited to, internet search history, transaction history, geographic location history, social media history, shopping lists, wish lists, account information, membership information, biometric information, health information, vitals, and/or any other history linked with the user 106. For example, the user history 904 comprises a history of products the user 106 recently looked at online but did not purchase. As another example, the user history 904 comprises a history of businesses the user 106 recently visited. As another example, the user history 904 comprises transaction history for identifies businesses proximate to the user 106. As another example, the user history 904 comprises health information, such as vitals history (e.g. heart rate and/or blood sugar history), for the user 106.

The augmented reality user device 400 is configured to present geographic notifications 908 and information from the received virtual assessment data 111 as one or more virtual objects overlaid with the tangible objects 150 in the real scene in front of the user 106. For example, the augmented reality user device 400 presents geographic notifications 908 identifying various offers for the user 106 as virtual objects overlaid with the objects 150 in front of the user 106.

In FIG. 9, the one or more processors 112 of the server 102 are configured to implement a geolocation analysis engine 906. In an embodiment, the geolocation analysis engine 906 is implemented using logic units, FPGAs, ASICs, DSPs, or any other suitable hardware. Examples of the geolocation analysis engine 906 in operation are described in detail below and in FIG. 11.

In one embodiment, the geolocation analysis engine 906 is configured to receive a token 110 and to process the token 110 to identify a user identifier 108 for the user 106, a location identifier 902 identifying the location of the user 106 or businesses proximate to the user 106, user history 904 for the user 106, and/or any other information. In one embodiment, processing the token 110 comprises decrypting and/or decoding the token 110 when the token 110 is encrypted or encoded by the augmented reality user device 400. The geolocation analysis engine 906 employs any suitable decryption or decoding technique as would be appreciated by one of ordinary skill in the art.

The geolocation analysis engine 906 is configured to use the user identifier 108 to look-up and identify account information for the user 106 in the account information database 120 in a manner similar to the product analysis engine 116 described in FIG. 1. In one embodiment, the geolocation analysis engine 906 is configured to use the user identifier 108 to look-up and identify user history 904 for the user 106. For example, the geolocation analysis engine 906 looks up transaction history, account information, membership information, and/or any other history for the user 106. The geolocation analysis engine 906 is also configured to determine whether there are any offers available for the user 106 based on information provided by the token 110 in a manner similar to the product analysis engine 116 described in FIG. 1.

The geolocation analysis engine 906 is configured to generate virtual assessment data 111 that comprises a geolocation notification 908. A geolocation notification 908 provides personalized information for the user 106 based on the location of the user 106 and businesses proximate to the user 106. Geolocation notification 908 may comprise information related to special offers, discounts, promotions, places of interest, and/or any other information related to businesses proximate to the user 106. Geolocation notifications 908 are presented to the user 106 as one or more virtual objects overlaid with tangible object in a real scene in front of the user 106. The geolocation analysis engine 906 sends the virtual assessment data 111 to the augmented reality user device 400.

The memory 114 of the server 102 is operable to store user history 904 and geolocation analysis instructions 910. The geolocation analysis instructions 910 comprise any suitable set of instructions, logic, rules, or code operable to execute the geolocation analysis engine 906.

The following is another non-limiting example of how the augmented reality system 100 may operate when the user 106 is looking at one or more businesses. In this example a user 106 is using the augmented reality user device 400 while walking around. For example, the user 106 is walking within a shopping mall or walking along a street. The user 106 authenticates themselves before using the augmented reality user device 400 by providing credentials (e.g. a log-in and password) or a biometric signal. The augmented reality user device 400 authenticates the user 106 based on the user's input and allows the user 106 to generate and send tokens 110. The augmented reality user device 400 identifies the user 106 and a user identifier 108 for the user 106 upon authenticating the user 106. Once the user 106 has been authenticated, the user identifier 108 is used by other systems and devices (e.g. remote server 102 or a third-party database 118) to identify and authenticate the user 106 without the user 106 having to provide additional credentials for each system.

Once the user 106 is authenticated, the augmented reality user device 400 identifies the location of the user 106. In one embodiment, the augmented reality user device 400 identifies the location of the user 106 based on the geographic location of the user 106 and/or businesses proximate to the user 106. For example, the augmented reality user device 400 uses geographic location information provided by a GPS sensor with a map database (e.g. a third-party database 118) to determine the location of the user 106 and to identify the geographic location of the user 106.

The user 106 looks at one or more businesses 912 with the augmented reality user device 400. The augmented reality user device 400 captures an image 407 of the businesses and performs object recognition and/or optical character recognition on the captured image 407 to identify the businesses. The augmented reality user device 400 identifies businesses based on their structures, branding, signs, logos, and/or any other features. For example, the augmented reality user device 400 identifies a business based on its logo on a sign in front of the business. In other embodiments, the augmented reality user device 400 identifies the location of the user 106 and/or businesses proximate to the user 106 using any other suitable technique.

The augmented reality user device 400 generates a token 110 and sends the token 110 to the remote server 102. In one embodiment, the augmented reality user device 400 generates a token 110 comprising the user identifier 108 for the user 106 and a location identifier 902 identifying the location of the user 106 and/or one or more businesses proximate to the user 106. In another embodiment, the token 110 further comprises user history 904 for the user 106, any other suitable information, and/or combinations of information. The augmented reality user device 400 encrypts and/or encodes the token 110 prior to sending the token 110 to the remote server 102.

The server 102 receives the token 110 and processes the token 110 to identify the user identifier 108, the location identifier 902, user history 904, and/or any other information provided by the token 110. The server 102 decrypts or decodes the token 110 when the token 110 is encrypted or encoded by the augmented reality user device 400. The server 102 uses the user identifier 108 to look-up account information and/or accounts for the user 106 in the account information database 120. The server 102 is configured to use the user identifier 108 to identify one or more accounts for the user 106. The server 102 may also use the user identifier 108 to look-up user history 904 for the user 106. For example, the server 102 identifies transaction history for the user 106 in the account information database 120 based on the user identifier 108.

In one embodiment, the server 102 determines whether there are any offers available for the user 106 based on the user's account information, the location of the user 106 (e.g. the location identifier 902), and/or the user history 904. For example, the server 102 identifies discounts or promotions being offered by businesses identified by the augmented reality user device 400. As another example, the server 102 identifies discounts or promotions available to the user 106 based on the location of the user 106 and the user history 904 (e.g. transaction history or internet search history).

In one embodiment, the server 102 queries one or more third-party databases 118 for available offers for the user 106 based on the user's 106 identity (e.g. the user identifier 108), the location of the user 106 (e.g. the location identifiers 902), and/or user history 904. For instance, a third-party database 118 linked with the store identified by the location identifier 904 and provides information related to coupons or promotions offered by the store.

In one embodiment, the server 102 identifies places of interest for the user 106 based on the location of the user 106 (e.g. the location identifier 902) and/or businesses in front of the user 106. For example, the server 102 uses information provided by the location identifier 902 to query a third-party database 118 linked with mapping information to identify places of interest for the user 106. The server 102 identifies stores, automated teller machines (ATMs), banks, restrooms, and/or any other places of interest for the user 106.

In one embodiment, the server 102 obtains information related to businesses or landmarks proximate to the user 106. For example, the sever 102 sends a data request 126 with information related to the location identifier 902 to a third-party database 118 to request information. The server 102 receives information about businesses or landmarks proximate to the user 106. The information about businesses or landmarks proximate to the user 106 may include, but is not limited to, hours of operations, schedule, contact information, and services offered.

The server 102 generates one or more geolocation notifications 908 that comprises information obtained based on the token 110. The geolocation notifications 908 may comprise information related to special offers, discounts, promotions, places of interest, and/or any other information related to businesses proximate to the user 106. The server 102 generates virtual assessment data 111 that comprises the one or more geolocation notifications 908. In other examples, the server 102 generates virtual assessment data 111 comprising any other type and/or combination of information. The server 102 then sends the virtual assessment data 111 to the augmented reality user device 400.

The augmented reality user device 400 receives the virtual assessment data 111 and processes the virtual assessment data 111 to access the information provided by the server 102. In one embodiment, the augmented reality user device 400 presents the geolocation notifications 908 for the user 106 as virtual objects 202 overlaid with their corresponding businesses 912 in the real scene in front of the user 106 in real time. In other embodiments, the augmented reality user device 400 presents recommendations, account information, for the user 106, and/or any other information as virtual objects 202 overlaid with tangible objects in the real scene.

In FIG. 9, when the user 106 looks at a gym 914, the augmented reality device 400 overlays a geolocation notification 916 indicating membership discounts are available at the gym 914. When the user 106 looks at a grocery store 918, the augmented reality user device 400 overlays a geolocation notification 920 indicating a sports drink sale and a geolocation notification 922 indicating a lunch special at a deli in the grocery store 918. The augmented reality user device 400 also overlays a geolocation notification 924 indicating an ATM is available inside of the grocery store 918. When the user 106 looks at an electronics store 926, the augmented reality user device 400 overlays a geolocation notification 928 indicating a product the user 106 previous search for, but did not purchase is available at the electronics store 926. The augmented reality user device 400 overlays a geolocation 930 indicating the location of the nearest bank as a point of interest for the user 106.

FIG. 10 is a flowchart of another embodiment of an augmented reality overlaying method 1000 for an augmented reality system 100. In one embodiment, the augmented reality system 100 is configured similar to the augmented reality system 100 described in FIG. 9. Method 1100 is employed by the processor 402 of the augmented reality user device 400 to generate a token 110 based on a user 106 of the augmented reality user device 400 and the location of the user 106. The augmented reality user device 400 uses the token 110 to determine whether there are any offers available for the user 106 based on the location of the user 106. The augmented reality user device 400 receives offer and information in response to sending the token 110 and presents the received offers and information as virtual objects overlaid with tangible object in a real scene in front of the user 106.

At step 1002, the augmented reality user device 400 authenticates a user 106. The user 106 authenticates themselves by providing credentials (e.g. a log-in and password) or a biometric signal. The augmented reality user device 400 authenticates the user 106 based on the user's input. The user 106 is able to generate and send tokens 110 using the augmented reality user device 400 upon authenticating the user 106.

At step 1004, the augmented reality user device 400 identifies a user identifier 108 for the user 106. Once the user 106 has been authenticated, the augmented reality user device 400 identifies the user 106 and a user identifier 108 for the user 106. The user identifier 108 may be used to identify and authenticate the user 106 in other systems.

At step 1006, the augmented reality user device 400 captures an image 407 of a business. In one embodiment, the user 106 provides a command or signal to the augmented reality user device 400 that triggers the camera 406 to capture an image 407 of a business. The image 407 of the business may include signs, branding, logos, structures, and/or any suitable features for identifying the business. In another embodiment, the augmented reality user device 400 and the camera 406 are configured to continuously or periodically capture images 407.

At step 1008, the augmented reality user device 400 identifies the business based on the image 407 of the business. For example, the augmented reality user device 400 identifies the business based on its structure and/or based on branding, text, or logos on or around the business. In other examples, the augmented reality user device 400 identifies the product based on any other features of the business and/or using any other suitable technique.

At step 1010, the augmented reality user device 400 determines the location of the user 106 based on the identity of the business and the geographic location of the user 106. In one embodiment, the augmented reality user device 400 uses geographic location information provided by the GPS sensor 416 with a map database to determine the location of the user 106 and to identify the business proximate to the user 106.

At step 1012, the augmented reality user device 400 obtains user history data for the user 106. For example, user history data comprises location history, interne search history, transaction history, biometric signal history, and/or any other kind of history for the user 106. The augmented reality user device 400 obtains user history data from a mobile device or any other suitable device. In some embodiments, step 1012 is optional and may be omitted.

At step 1014, the augmented reality user device 400 generates a token 110. In one embodiment, the token 110 comprises the user identifier 108 and a location identifier 902. In other embodiments, the token 110 comprises user history 904 and/or any other information. At step 1016, the augmented reality user device 400 sends the token 110 to a remote server 102.

At step 1018, the augmented reality user device 400 receives virtual assessment data 111 comprising a geolocation notification 908 for a product sold or service offered by the business based on the location of the user 106. In one embodiment, the virtual assessment data 111 comprises a geolocation notification 908 identifying a points of interest (e.g. an ATM) and/or any other information.

At step 1020, the augmented reality user device 400 presents the geolocation notification 908 as a virtual object overlaid within a real scene in front of the user 106. The augmented reality user device 400 presents the geolocation notification 908 and any other information provided by the virtual assessment data 111 as virtual objects overlaid on top of the business or adjacent to the business. When the augmented reality user device 400 presents the virtual objects to the user 106, the user 106 can readily see any offers that are available to the user 106.

At step 1022, the augmented reality user device 400 determines whether the augmented reality user device 400 is configured for continuous operation. For example, the augmented reality user device 400 determines whether the augmented reality user device 400 is configured to continuously capture images 407 of businesses around the user 106. The augmented reality user device 400 returns to step 1006 when the augmented reality user device 400 is configured for continuous operation. Otherwise, the augmented reality user device 400 terminates method 1000.

FIG. 11 is a flowchart of another embodiment of an augmented reality overlaying method 1100 for an augmented reality system 100. In one embodiment, the augmented reality system 100 is configured similar to the augmented reality system 100 described in FIG. 9. Method 1100 is employed by the geolocation analysis engine 906 in the server 102 to identify available offers for the user 106 of an augmented reality user device 400 and provides geolocation notifications 908 to the user 106 in response to receiving a token 110 from the augmented reality user device 400.

At step 1102, the geolocation analysis engine 906 receives a token 110 identifying a user identifier 108 and a location identifier 902. The geolocation analysis engine 906 decrypts and/or decodes the token 110 when the token 110 is encrypted or encoded by the augmented reality user device 400. In one embodiment, the geolocation analysis engine 906 processes the token 110 to identify the user identifier 108 and the location identifier 902. In other embodiments, the geolocation analysis engine 906 processes the token 110 to identify any other information, for example, user history 904.

At step 1104, the geolocation analysis engine 906 determines account information for the user 106 based on the user identifier 108. For example, the geolocation analysis engine 906 uses the user identifier 108 to look-up the account information for the user 106 in the account information database 120.

At step 1106, the geolocation analysis engine 906 generates a geolocation notification 908 based on the token 110. In one embodiment, the geolocation analysis engine 906 generates a geolocation notification 908 based on user history data for the user 106. The user history data may be provided by the token 110 or may be determined using the user identifier 108. In one example, the geolocation analysis engine 906 identifies a product or offer based on an internet search history for the user 106. The geolocation analysis engine 906 determines whether the business sells a product the user 106 recently searched for and/or has an offer available for the product. When the business sells the product or has an offer available for the product, the geolocation analysis engine 906 generates a geolocation notification 908 identifying the product and/or the offer for the product.

In another example, the geolocation analysis engine 906 identifies an unpurchased product based on internet search history and a transaction history for the user 106. The geolocation analysis engine 906 determines whether the business sells a product the user 106 recently searched for and/or has an offer available for the product. The geolocation analysis engine 906 uses the transaction history to determine whether the user 106 has already purchased the product. When the business sells the product and the user 106 has not already purchased the product, the geolocation analysis engine 906 generates a geolocation notification 908 identifying the unpurchased product and/or an offer for the unpurchased product.

In another example, the geolocation analysis engine 906 identifies a product or offer based on a location history for the user 106. The geolocation analysis engine 906 determines products or offers the user 106 may be interested in based on the recently visited physical locations. For instance, the geolocation analysis engine 906 determines that the user 106 recently visited a gym and may identify water or a sale on water for the user 106. The geolocation analysis engine 906 generates a geolocation notification 908 identifying the product and/or offer.

In another example, the geolocation analysis engine 906 identifies a product or offer based on the vitals or biometric signals for the user 106. For instance, the geolocation analysis engine 906 identifies a sports drink or sale on sports drinks when the user's 106 blood sugar is low. The geolocation analysis engine 906 generates a geolocation notification 908 identifying the product and/or offer.

In another example, the geolocation analysis engine 906 identifies a product or offer based on the time of day and transaction history for the user 106. For instance, the geolocation analysis engine 906 determines that it is lunch time and determines the type of food the user 106 typically purchases at lunch time based on the transaction history. The geolocation analysis engine 906 identifies any lunch offers the user 106 may be interested in. The geolocation analysis engine 906 generates a geolocation notification 908 identifying the offers.

In some embodiments, the geolocation analysis engine 906 identifies places of interest for the user 106 based on the location of the user 106. For example, the geolocation analysis engine 906 identifies ATMS, banks, restrooms, landmarks, or any other places of interest for the user. The geolocation analysis engine 906 identifies the places of interest for the user 106 based on account information, user history data, and/or any other information for the user 106. The geolocation analysis engine 906 generates a geolocation notification 908 identifying the places of interest.

At step 1108, the geolocation analysis engine 906 generates virtual assessment data 111 comprising the geolocation notification 908. In some embodiments, the virtual assessment data 111 further comprises account information and/or any other information for the user 106. At step 1110, the geolocation analysis engine 906 sends the virtual assessment data 111 to the augmented reality user device 400.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An augmented reality system comprising:
   an augmented reality user device for a user comprising:
   a display configured to overlay virtual objects onto tangible objects in a real scene in real-time;
   a camera configured to capture images;
   a global position system (GPS) sensor configured to provide the geographic location of the user;
   one or more processors operably coupled to the display, the camera, and the GPS sensor, and configured to implement:
   an object recognition engine configured to identify a business based on an image of the business;
   a virtual assessment engine configured to:
   authenticate a user based on a user input;
   identify a user identifier for the user in response to authenticating the user;
   generate a location identifier identifying the business;
   obtain user history for the user;
   obtain product identifiers identifying a plurality of objects in a shopping cart of the user;
   generate a token comprising:
   the user history for the user;
   the user identifier for the user;
   the product identifiers; and
   the location identifier;
   send the token to a remote server;
   receive virtual assessment data comprising a geolocation notification identifying:
   an offer provided by the business in response to sending the token, wherein the offer is based at least on the product identifiers from the token;
   a recommended one of a plurality of user accounts to use for a purchase transaction; and a virtual overlay engine configured to present the geolocation notification as a virtual object overlaid within a real scene; and the remote server comprising a geolocation analysis engine for the remote server configured to:
receive the token;
determine account information for the user based on the user identifier for the user;
identify the offer provided by the business based at least on discounts that can be applied to one or more objects in the shopping cart of the user and the account information for the user;
generate the geolocation notification identifying the offer;
generate the virtual assessment data comprising the geolocation notification; and
send the virtual assessment data to the augmented reality user device.

2. The system of claim 1, wherein:
the user history comprises an internet search history for the user; and
generating the geolocation notification further comprises:
identifying a product based on the internet search history for the user;
determining the business sells the identified product; and
generating the geolocation notification identifying the product.

3. The system of claim 1, wherein:
the account information comprises a transaction history for the user;
the user history comprises an internet search history for the user; and
generating the geolocation notification further comprises:
identifying an unpurchased product based on the internet search history and the transaction history for the user;
determining the business sells the unpurchased product; and
generating the geolocation notification identifying the unpurchased product.

4. The system of claim 1, wherein:
the user history comprises a location history identifying recently visited physical locations for the user; and
generating the geolocation notification further comprises:
identifying a product based on the location history for the user;
determining the business sells the identified product; and
generating the geolocation notification identifying the product.

5. The system of claim 1, wherein:
the user history comprises biometric signals for the user; and
generating the geolocation notification further comprises:
identifying a product based on the biometric signals for the user;
determining the business sells the product; and
generating the geolocation notification identifying the product.

6. The system of claim 1, wherein:
the account information comprises a transaction history for the user; and
generating the geolocation notification further comprises:
identifying a product based on the time of the day and the transaction history for the user;
determining the business sells the product; and
generating the geolocation notification identifying the product.

7. The system of claim 1, wherein the location identifier indicates the geographic location of the user.

8. An augmented reality overlaying method comprising:
authenticating, by a virtual assessment engine, a user based on a user input;
identifying, by the virtual assessment engine, a user identifier for the user in response to authenticating the user;
generating, by the virtual assessment engine, a location identifier identifying the business;
obtaining, by the virtual assessment engine, user history for the user;
obtaining, by the virtual assessment engine, product identifiers identifying a plurality of objects in a shopping cart of the user;
generating, by the virtual assessment engine, a token comprising the user history for the user, the user identifier for the user, the product identifiers, and the location identifier;
sending, by the virtual assessment engine, the token to a remote server;
determining, by a geolocation analysis engine of the remote server, account information for the user based on the user identifier;
identifying, by the geolocation analysis engine, (a) the offer provided by the business based at least on discounts that can be applied to one or more objects in the shopping cart of the user and the account information for the user; and (b) a recommended one of a plurality of user accounts to use for a purchase transaction;
generating, by the geolocation analysis engine, a geolocation notification identifying the offer;
generating, by the geolocation analysis engine, the virtual assessment data comprising the geolocation notification;
sending, by the geolocation analysis engine, the virtual assessment data to the augmented reality user device; and
presenting, by a virtual overlay engine, the geolocation notification as a virtual object overlaid within a real scene.

9. The method of claim 8, wherein the location identifier indicates the geographic location of the user.

10. The method of claim 8, wherein:
the user history comprises an internet search history for the user; and
generating the geolocation notification further comprises:
identifying a product based on the internet search history for the user;
determining the business sells the identified product; and
generating the geolocation notification identifying the product.

11. The method of claim 8, wherein:
the account information comprises a transaction history for the user;
the user history comprises an internet search history for the user; and
generating the geolocation notification further comprises:
identifying an unpurchased product based on the internet search history and the transaction history for the user;
determining the business sells the unpurchased product; and generating the geolocation notification identifying the unpurchased product.

12. The method of claim 8, wherein:

the user history comprises a location history identifying recently visited physical locations for the user; and generating the geolocation notification further comprises:
identifying a product based on the location history for the user;
determining the business sells the identified product; and
generating the geolocation notification identifying the product.

13. The method of claim 8, wherein:

the user history comprises biometric signals for the user; and generating the geolocation notification further comprises:
identifying a product based on the biometric signals for the user;
determining the business sells the product; and
generating the geolocation notification identifying the product.

14. The method of claim 8, wherein:

the account information comprises a transaction history for the user; and generating the geolocation notification further comprises:
identifying a product based on the time of the day and the transaction history for the user;
determining the business sells the product; and
generating the geolocation notification identifying the product.

15. An augmented reality user device for a user comprising:

a display configured to overlay virtual objects onto tangible objects in a real scene in real-time;
a camera configured to capture images;
a global position system (GPS) sensor configured to provide the geographic location of the user;
one or more processors operably coupled to the display, the camera, and the GPS sensor, and configured to implement:
an object recognition engine configured to identify a business based on an image of the business;
a virtual assessment engine configured to:
authenticate a user based on a user input;
identify a user identifier for the user in response to authenticating the user;
generate a location identifier identifying the business;
obtain product identifiers identifying a plurality of objects in a shopping cart of the user;
generate a token comprising:
the user identifier;
the product identifiers; and
the location identifier;
send the token to a remote server;
receive virtual assessment data comprising a geolocation notification identifying:
an offer provided by the business in response to sending the token, wherein the offer is based at least on discounts that can be applied to one or more objects in the shopping cart of the user;
a recommended one of a plurality of user accounts to use for a purchase transaction; and
a virtual overlay engine configured to present the geolocation notification as a virtual object overlaid within a real scene.

16. The device of claim 15, wherein the location identifier indicates the geographic location of the user.

17. The device of claim 15, wherein:

the token comprises user history data comprising an internet search history for the user; and
the geolocation notification identifies a product sold by the business based on the internet search history for the user.

18. The device of claim 15, wherein:

the token comprises user history data comprising a location history identifying recently visited physical locations for the user; and
the geolocation notification identifies a product sold by the business based on the location history.

19. The device of claim 15, wherein:

the token comprises user history data comprising biometric signals for the user; and
the geolocation notification identifies a product sold by the business based on the biometric signals for the user.

20. The device of claim 15, wherein the geolocation notification identifies one or more places of interest.

* * * * *